United States Patent
Wan

(10) Patent No.: US 9,524,137 B2
(45) Date of Patent: Dec. 20, 2016

(54) ELECTRONIC APPARATUS

(71) Applicant: Lenovo (Beijing) Co., Ltd., Beijing (CN)

(72) Inventor: Xi Wan, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 53 days.

(21) Appl. No.: 14/583,309

(22) Filed: Dec. 26, 2014

(65) Prior Publication Data

US 2016/0041804 A1   Feb. 11, 2016

(30) Foreign Application Priority Data

Aug. 5, 2014   (CN) .......................... 2014 1 0381744

(51) Int. Cl.
| | |
|---|---|
| G06F 3/14 | (2006.01) |
| G06F 1/16 | (2006.01) |
| G06F 3/01 | (2006.01) |
| G02F 1/00 | (2006.01) |

(52) U.S. Cl.
CPC ............... *G06F 3/1423* (2013.01); *G02F 1/00* (2013.01); *G06F 1/163* (2013.01); *G06F 1/1647* (2013.01); *G06F 3/013* (2013.01); *G09G 2330/021* (2013.01); *G09G 2354/00* (2013.01)

(58) Field of Classification Search
CPC ...... G06F 3/1423; G06F 3/1446; G06F 3/013; G06F 1/163; G06F 1/1637; G06F 1/1647; H04N 9/31; H04N 9/3102; H04N 9/3129; H04N 9/3141; G09G 2300/026; G09G 2330/021; G02F 1/00

USPC .......................................................... 345/1.3
See application file for complete search history.

(56) References Cited

U.S. PATENT DOCUMENTS

| | | | |
|---|---|---|---|
| 2008/0014995 A1* | 1/2008 | Noba .................. | H04M 1/0214 455/566 |
| 2008/0079916 A1* | 4/2008 | Noba ....................... | H04N 5/74 353/119 |
| 2008/0247128 A1* | 10/2008 | Khoo .................... | G06F 1/1616 361/679.04 |
| 2009/0079664 A1* | 3/2009 | Nagai .................. | G02F 1/13336 345/1.3 |
| 2010/0053069 A1* | 3/2010 | Tricoukes ............. | G06F 3/1431 345/156 |
| 2011/0157668 A1* | 6/2011 | Maeda ................. | H04N 9/3129 359/205.1 |
| 2012/0092234 A1* | 4/2012 | Trooskin-Zoller .... | G06F 3/1446 345/1.3 |
| 2012/0175507 A1* | 7/2012 | Yen ....................... | H04N 9/3141 250/229 |
| 2015/0003210 A1* | 1/2015 | Joung ................... | G04G 17/00 368/10 |

(Continued)

*Primary Examiner* — Tom Sheng
(74) *Attorney, Agent, or Firm* — Brinks Gilson & Lione; G. Peter Nichols

(57) ABSTRACT

An electronic apparatus includes a frame body, a fixing device, and a functional main section. The fixing device is connected with the frame body and configured to fix the electronic apparatus to a support body, and the frame body and the fixing device form an annular space when the electronic apparatus is fixed to the support body by the fixing device. The functional main section includes a display device provided within the frame body and having a first display area and a second display area, with the first display area being larger than the second display area.

9 Claims, 8 Drawing Sheets

(56) References Cited

U.S. PATENT DOCUMENTS

2015/0378662 A1* 12/2015 Wan .................. G06F 3/1423
345/156

* cited by examiner

ELECTRONIC APPARATUS

This application claims priority to Chinese patent application No. CN201410381744.2 filed on Aug. 5, 2014, the entire contents of which are incorporated herein by reference.

BACKGROUND

The present application relates to information processing technique, and particularly, to an electronic apparatus.

Various electronic apparatuses such as smart phone and touch screen become popular, and a multi-functional smart watch including a touch screen appears in the market. Typically, a smart watch displays only a single interface on which various types of information are shown, for instance, it may include time, date, temperature, and other information. However, at present, it is still inconvenient to display various types of information in a single display interface.

SUMMARY

It is provided an electronic apparatus comprising a frame body, a fixing device, and a functional main section. The fixing device is connected with the frame body and configured to fix the electronic apparatus to a support body, and the frame body and the fixing device form an annular space when the electronic apparatus is fixed to the support body by the fixing device. The functional main section comprises a display device provided within the frame body and having a first display area and a second display area, the first display area being larger than the second display area. Wherein when a first display content is displayed in the first display area via the display device, a first display output area corresponding to the first display area is formed on an outer surface of the frame body, so that the user obtains a first perceived image when viewing the first display output area in a first interaction manner, content of the first perceived image is the first display content; when a second display content is displayed in the second display area via the display device, a second display output area corresponding to the second display area is formed on an outer surface of the frame body, so that the user obtains a second perceived image when viewing the second display output area in a second interaction manner, content of the second perceived image is the second display content; size of the first perceived image is smaller than that of the second perceived image, the first display output area is larger than the second display output area; the first interaction manner is different from the second interaction manner.

The electronic apparatus provided by the embodiments of the present application is capable of generating the first display output area and the second display output area at an outer surface of the frame body, the first display output area is larger than the second display output area, and size of the first perceived image is smaller than that of the second perceived image. Thereby, multiple areas are physically divided on the electronic apparatus, and more and richer information can be shown on the outer surface of the frame body.

DETAILED DESCRIPTION

Hereinafter, the present application will be further described in detail in conjunction with the accompanying drawings and the specific embodiments.

First Embodiment

Figure 1:
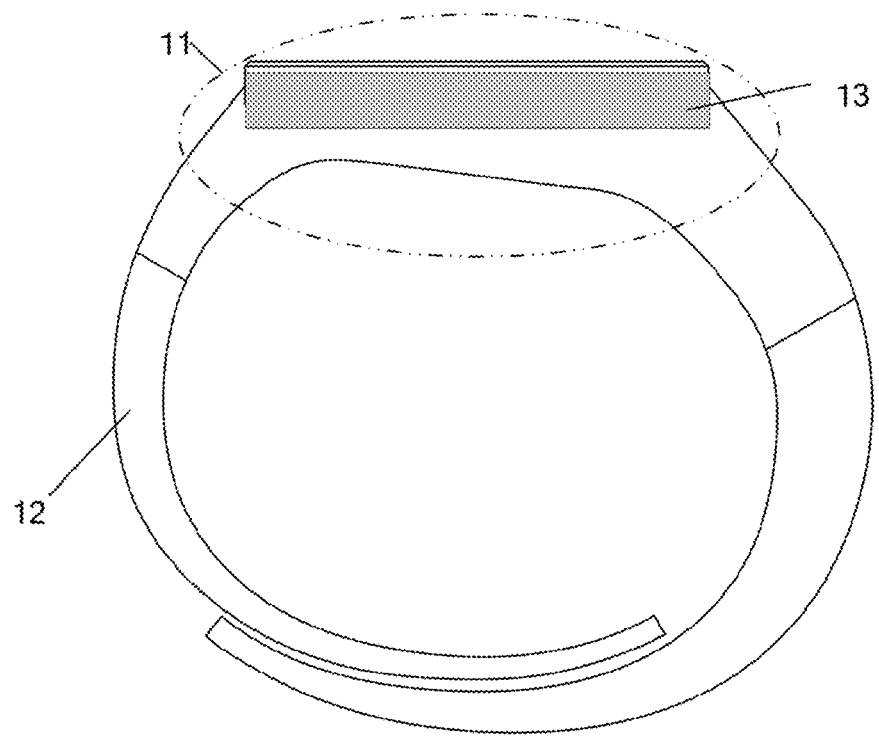
FIG. 1 is a first structural schematic diagram of the electronic apparatus according to an embodiment of the present application.

The embodiment of the present application provides an electronic apparatus, as shown in FIG. 1, the electronic apparatus comprises: a frame body 11, a fixing device 12, and a functional main section 13. The fixing device 12 is connected with the frame body 11 and configured to fix the electronic apparatus to a support body, and the frame body 11 and the fixing device 12 form an annular space when the electronic apparatus is fixed to the support body by the fixing device 12. The functional main section 13 comprises a display device provided within the frame body 11 and having a first display area and a second display area, the first display area being larger than the second display area. Wherein when a first display content is displayed in the first display area via the display device, a first display output area corresponding to the first display area is formed on an outer surface of the frame body, so that the user obtains a first perceived image when viewing the first display output area in a first interaction manner, content of the first perceived image is the first display content; when a second display content is displayed in the second display area via the display device, a second display output area corresponding to the second display area is formed on an outer surface of the frame body, so that the user obtains a second perceived image when viewing the second display output area in a second interaction manner, content of the second perceived image is the second display content; size of the first perceived image is smaller than that of the second perceived image, the first display output area is larger than the second display output area; the first interaction manner is different from the second interaction manner.

Here, the electronic apparatus may be a smart watch, and the frame body comprises a dial of the smart watch. The support body may be the user's wrist.

The first display area and the second display area both are a physical concept, that is, the display modules that actually show the first and second display contents.

The first display area and the second display area may correspond to the same set of display module, or correspond to two sets of display module having the same display principle. Alternatively, the first display area and the second display area correspond to display modules having different display principles, wherein the first display module and the second display module may be of a parallel positional relationship, and may also be of a stacked positional relationship. The first display output area may be of the same size as the first display area; the second display output area is larger than the second display area, for instance, when the second display module is a projection module, the second display area is a reflection unit composed of a prism, and the second display output area is a spot formed by projecting onto the outer surface of the frame body. The first display output area is larger than the second display output area in terms of physical size.

When the first display area and the second display area are the same set of display module, a mode of achieving that size of the first perceived image is smaller than that of the second perceived image may be controlling the display module to directly display the first display content in the first display area, causing the outer surface of the frame body to which the second display area corresponds to be made of material having magnifying glass effect, so that when the display module displays the second display content in the second display area, size of the obtained second perceived image is much larger.

Figure 2:
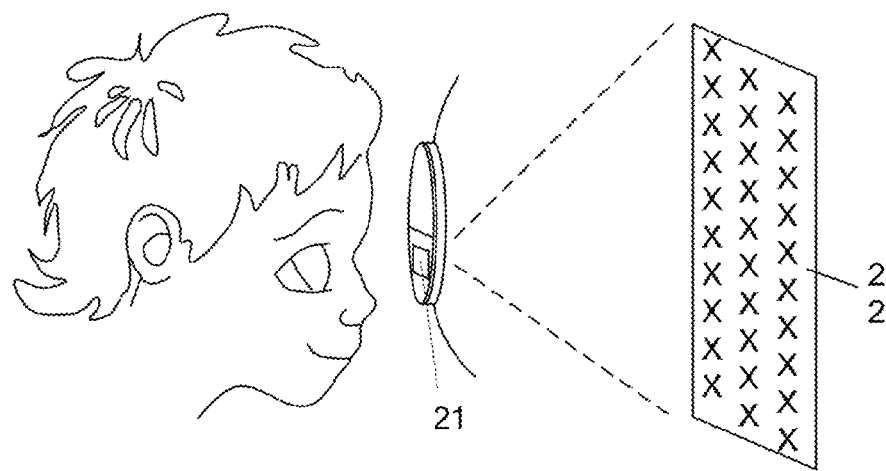
FIG. 2 is a first schematic diagram of a using scenario of an embodiment of the present application.

When the first display area and the second display area are different display modules, a display mode of the first display area and the second display area may be controlled by software, thereby achieving that size of the first perceived image is smaller than that of the second perceived image; an implementation thereof may be that the display module is controlled to directly display the first display content in the first display area, and the second display module is a projection module, the second perceived image 22 is obtained when the user views the second display content via the second display output area 21 as shown in FIG. 2, obviously, the second perceived image 22 can enable the user to observe content with a larger size.

Accordingly, by means of adopting the above solution, the first display output area and the second display output area can be obtained on the outer surface of the frame body, the first display output area is larger than the second display output area, and size of the first perceived image is smaller than that of the second perceived image. Thereby, multiple areas are physically divided on the electronic apparatus, and more information can be shown on the outer surface of the frame body.

Second Embodiment

The embodiment of the present application provides an electronic apparatus, as shown in FIG. 1, the electronic apparatus comprises: a frame body 11, a fixing device 12, and a functional main section 13. The fixing device 12 is connected with the frame body 11 and configured to fix the electronic apparatus to a support body, and the frame body 11 and the fixing device 12 form an annular space when the electronic apparatus is fixed to the support body by the fixing device 12. The functional main section 13 comprises a display device provided within the frame body 11 and having a first display area and a second display area, the first display area being larger than the second display area. When a first display content is displayed in the first display area via the display device, a first display output area corresponding to the first display area is formed on an outer surface of the frame body, so that the user obtains a first perceived image when viewing the first display output area in a first interaction manner, content of the first perceived image is the first display content; when a second display content is displayed in the second display area via the display device, a second display output area corresponding to the second display area is formed on an outer surface of the frame body, so that the user obtains a second perceived image when viewing the second display output area in a second interaction manner, content of the second perceived image is the second display content; size of the first perceived image is smaller than that of the second perceived image, the first display output area is larger than the second display output area; the first interaction manner is different from the second interaction manner.

Here, the electronic apparatus may be a smart watch; the frame body may include a dial of the smart watch. In an embodiment of the present application, the support body may be the user's wrist, and may also be the user's other body parts; of course, the support body may also be any object other than the user's body parts, for instance, it may be a prosthetic arm, etc., and may also be a hand lever in a bus or a subway train. In the embodiment of the present application, the electronic apparatus is a wearable electronic apparatus, as an embodiment, the electronic apparatus may also a smart ring. When the electronic apparatus is a smart ring, correspondingly, the support body may be a finger.

The first display area and the second display area both are a physical concept, that is, the display modules that actually show the first and second display contents.

The first display area and the second display area may correspond to the same set of display module, or correspond to two sets of display module having the same display principle, wherein the display modules are located under the dial of the frame body, the first display area may be located in the upper half portion of the dial, the second display area may be located in the lower half portion of the dial.

Figure 3A:
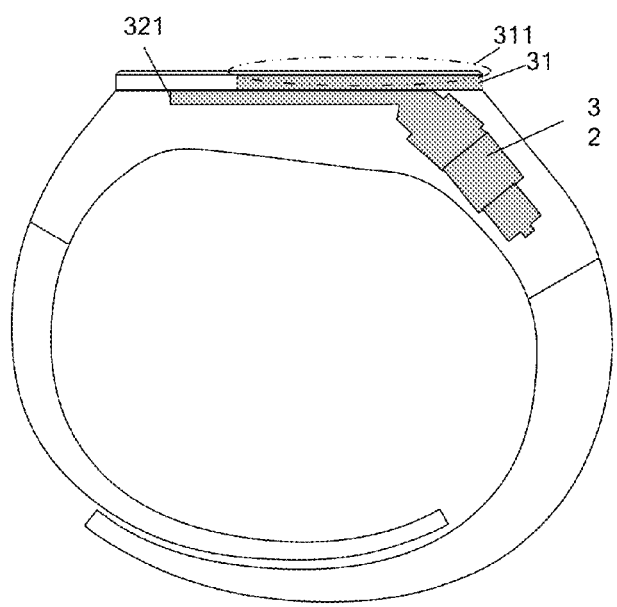
FIG. 3a is a second structural schematic diagram of the electronic apparatus according to an embodiment of the present application.

Alternatively, as shown in FIG. 3, the display device in the functional main body comprises a first display module 31 and a second display module 32, the first display module 31 and the second display module 32 have different display principles. e first display module 31 has the first display area 311; the second display module 32 has the second display area 312; due to different display principles of the first display module 31 and the second module 32, the first interaction manner that the user uses the first display module 31 of the electronic apparatus and the second interaction manner that the user uses the second display module 32 of the electronic apparatus are different. The first interaction manner is a viewing manner that the user's eyes are away from the first display output area on the electronic apparatus; the second interaction manner is a viewing manner that the user's eyes approach the second display output area on the electronic apparatus. When the user is away from the first display output area on the electronic apparatus in the first interaction manner, the user's eyes cause the user to perceive the first perceived image; size of the first perceived image is equal to that of the first display output area; when the user approaches the second display output area on the electronic apparatus in the second interaction manner, a light beam emitted by the second display module is incident to the user's eyes, so that the user perceives the second perceived image; size of the second perceived image is larger than that of the second display output area.

The first display area 31 and the second display area 32 correspond to different display modules, which may be the first display module 311 and the second display module 321, respectively, wherein the first display module 311 and the second display module 321 may be of a parallel positional relationship, and may also be of a stacked positional relationship.

Figure 3B:
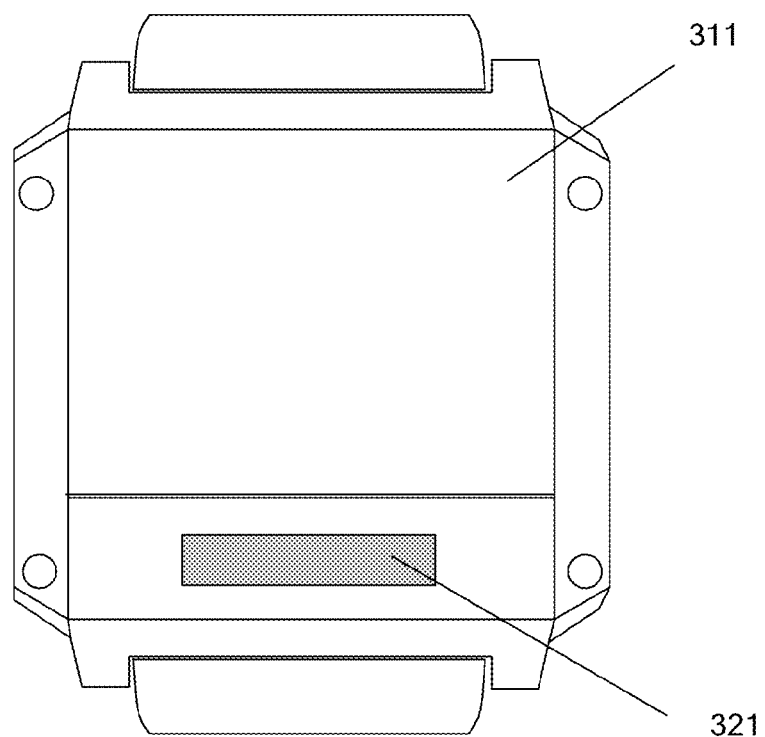
FIG. 3b is a schematic diagram of style of an outer surface of the electronic apparatus according to an embodiment of the present application.

The first display output area 312 may be of the same size as the first display area 31; the second display output area 322 is larger than the second display area 32, for instance, when the second display module is a projection module, the second display area is a reflection unit composed of a prism, and the second display output area 322 is a spot formed by projecting onto the outer surface of the frame body. The first display output area 312 is larger than the second display output area 322 in terms of physical size, as shown in FIG. 3b.

When the first display area and the second display area are different display modules, a display mode of the first display area and the second display area may be controlled by software, thereby achieving that size of the first perceived image is smaller than that of the second perceived image; an implementation thereof may be that the display module is controlled to directly display the first display content, and the second display module is a projection module, the second perceived image 22 is obtained when the user views the second display content via the second display output area 21 as shown in FIG. 2, obviously, the second perceived image 22 can enable the user to observe content with a larger size.

Accordingly, by means of adopting the above solution, the first display output area and the second display output area can be obtained on the outer surface of the frame body, the first display area is larger than the second display area, and size of the first perceived image is smaller than that of the second perceived image. Thereby, multiple areas are physically divided on the electronic apparatus, and more information can be shown on the outer surface of the frame body.

Third Embodiment

The embodiment of the present application provides an electronic apparatus, as shown in FIG. 1, the electronic apparatus comprises: a frame body 11, a fixing device 12, and a functional main section 13.

The fixing device 12 is connected with the frame body 11 and configured to fix the electronic apparatus to a support body, and the frame body 11 and the fixing device 12 form an annular space when the electronic apparatus is fixed to the support body by the fixing device 12; the functional main section 13 comprises a display device provided within the frame body 11 and having a first display area and a second display area, the first display area being larger than the second display area; wherein when a first display content is displayed in the first display area via the display device, a first display output area corresponding to the first display area is formed on an outer surface of the frame body, so that the user obtains a first perceived image when viewing the first display output area in a first interaction manner, content of the first perceived image is the first display content; when a second display content is displayed in the second display area via the display device, a second display output area corresponding to the second display area is formed on an outer surface of the frame body, so that the user obtains a second perceived image when viewing the second display output area in a second interaction manner, content of the second perceived image is the second display content; size of the first perceived image is smaller than that of the second perceived image, the first display output area is larger than the second display output area; the first interaction manner is different from the second interaction manner.

Here, the electronic apparatus may be a smart watch; the frame body may include a dial of the smart watch. In an embodiment of the present application, the support body may be the user's wrist, and may also be the user's other body parts; of course, the support body may also be any object other than the user's body parts, for instance, it may be a prosthetic arm, etc., and may also be a hand lever in a bus or a subway train. In the embodiment of the present application, the electronic apparatus is a wearable electronic apparatus, as an embodiment, the electronic apparatus may also a smart ring. When the electronic apparatus is a smart ring, correspondingly, the support body may be a finger.

The first display area and the second display area both are a physical concept, that is, the display modules that actually show the first and second display contents.

The first display area and the second display area may correspond to the same set of display module, or correspond to two sets of display module having the same display principle, wherein the display modules are located under the dial of the frame body, the first display area may be located in the upper half portion of the dial, the second display area may be located in the lower half portion of the dial.

Alternatively, as shown in FIG. 3, the display device in the functional main body comprises a first display module 31 and a second display module 32, the first display module 31 and the second display module 32 have different display principles; wherein the first display module 31 has the first display area 311; the second display module 32 has the second display area 312; due to different display principles of the first display module 31 and the second module 32, the first interaction manner that the user uses the first display module 31 of the electronic apparatus and the second interaction manner that the user uses the second display module 32 of the electronic apparatus are different; the first interaction manner is a viewing manner that the user's eyes are away from the first display output area on the electronic apparatus; the second interaction manner is a viewing manner that the user's eyes approach the second display output area on the electronic apparatus; when the user is away from the first display output area on the electronic apparatus in the first interaction manner, the user's eyes cause the user to perceive the first perceived image; size of the first perceived image is equal to that of the first display output area; when the user approaches the second display output area on the electronic apparatus in the second interaction manner, a light beam emitted by the second display module is incident to the user's eyes, so that the user perceives the second perceived image; size of the second perceived image is larger than that of the second display output area.

The first display area 31 and the second display area 32 correspond to different display modules, which may be the first display module 311 and the second display module 321, respectively, wherein the first display module 311 and the second display module 321 may be of a parallel positional relationship, and may also be of a stacked positional relationship.

The first display output area 312 may be of the same size as the first display area 31; the second display output area 322 is larger than the second display area 32, for instance, when the second display module is a projection module, the second display area is a reflection unit composed of a prism, and the second display output area 322 is a spot formed by projecting onto the outer surface of the frame body. The first display output area 312 is larger than the second display output area 322 in terms of physical size.

When the first display area and the second display area are different display modules, a display mode of the first display area and the second display area may be controlled by software, thereby achieving that size of the first perceived image is smaller than that of the second perceived image; an implementation thereof may be that the display module is controlled to directly display the first display content, and the second display module is a projection module, the second perceived image 22 is obtained when the user views the second display content via the second display output area 21 as shown in FIG. 2, obviously, the second perceived image 22 can enable the user to observe content with a larger size.

Figure 4:
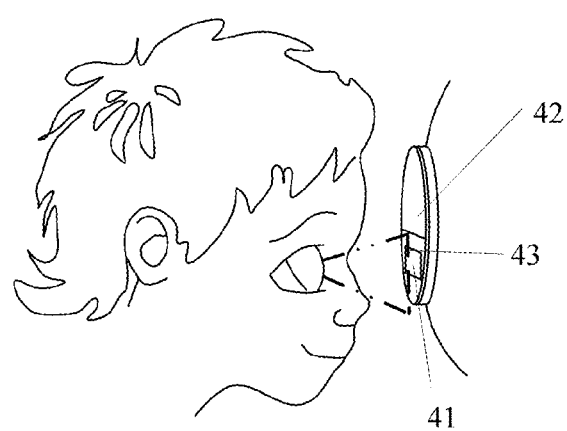
FIG. 4 is a second schematic diagram of a using scenario of an embodiment of the present application.

The second display area is smaller than or equal to a predetermined area; the first display area is larger than the predetermined area; wherein the predetermined area may be an area value set in advance according to a practical situation, for instance, the predetermined area may be set as 2 square centimeters; or alternatively, the predetermined area is area of a cross-section of vision field of the user's eyes when the user's eyes and the electronic apparatus satisfy a predetermined distance; the predetermined distance may be set in advance according to a practical situation, for instance, the predetermined distance may be set as 1 cm, as shown in FIG. 4, it is supposed that the user's eyes can see a whole picture of the second display output area 41 when approaching the electronic apparatus, but they can only see a portion of the first display output area 42. In addition, in an actual implementation process, the predetermined distance may be set for each user individually, for instance, a user A will get a more comfortable viewing experience at 2 cm, then area of a cross-section of vision field of the user's eyes will be determined according to this predetermined distance, and further, size of the second display output area will be determined. In this way, size of the second display output area can be set flexibly according to an actual situation, to further enhance visual experience of the user when using the electronic apparatus.

Accordingly, by means of adopting the above solution, the first display output area and the second display output area can be obtained on the outer surface of the frame body, the first display area is larger than the second display area, and size of the first perceived image is smaller than that of the second perceived image. Thereby, multiple areas are physically divided on the electronic apparatus, and more information can be shown on the outer surface of the frame body.

Fourth Embodiment

The embodiment of the present application provides an electronic apparatus, as shown in FIG. 1, the electronic apparatus comprises: a frame body 11, a fixing device 12, and a functional main section 13. The fixing device 12 is connected with the frame body 11 and configured to fix the electronic apparatus to a support body, and the frame body 11 and the fixing device 12 form an annular space when the electronic apparatus is fixed to the support body by the fixing device 12. The functional main section 13 comprises a display device provided within the frame body 11 and having a first display area and a second display area, the first display area being larger than the second display area; wherein when a first display content is displayed in the first display area via the display device, a first display output area corresponding to the first display area is formed on an outer surface of the frame body, so that the user obtains a first perceived image when viewing the first display output area in a first interaction manner, content of the first perceived image is the first display content; when a second display content is displayed in the second display area via the display device, a second display output area corresponding to the second display area is formed on an outer surface of the frame body, so that the user obtains a second perceived image when viewing the second display output area in a second interaction manner, content of the second perceived image is the second display content; size of the first perceived image is smaller than that of the second perceived image, the first display output area is larger than the second display output area; the first interaction manner is different from the second interaction manner.

Here, the electronic apparatus may be a smart watch; the frame body may include a dial of the smart watch. In an embodiment of the present application, the support body may be the user's wrist, and may also be the user's other body parts; of course, the support body may also be any object other than the user's body parts, for instance, it may be a prosthetic arm, etc., and may also be a hand lever in a bus or a subway train. In the embodiment of the present application, the electronic apparatus is a wearable electronic apparatus, as an embodiment, the electronic apparatus may also a smart ring. When the electronic apparatus is a smart ring, correspondingly, the support body may be a finger.

The first display area and the second display area both are a physical concept, that is, the display modules that actually show the first and second display contents.

The first display area and the second display area may correspond to the same set of display module, or correspond to two sets of display module having the same display principle, wherein the display modules are located under the dial of the frame body, the first display area may be located in the upper half portion of the dial, the second display area may be located in the lower half portion of the dial.

Alternatively, as shown in FIG. 3, the display device in the functional main body comprises a first display module 31 and a second display module 32, the first display module 31 and the second display module 32 have different display principles; wherein the first display module 31 has the first display area 311; the second display module 32 has the second display area 312; due to different display principles of the first display module 31 and the second module 32, the first interaction manner that the user uses the first display module 31 of the electronic apparatus and the second interaction manner that the user uses the second display module 32 of the electronic apparatus are different; the first interaction manner is a viewing manner that the user's eyes are away from the first display output area on the electronic apparatus; the second interaction manner is a viewing manner that the user's eyes approach the second display output area on the electronic apparatus; when the user is away from the first display output area on the electronic apparatus in the first interaction manner, the user's eyes cause the user to perceive the first perceived image; size of the first perceived image is equal to that of the first display output area; when the user approaches the second display output area on the electronic apparatus in the second interaction manner, a light beam emitted by the second display module is incident to the user's eyes, so that the user perceives the second perceived image; size of the second perceived image is larger than that of the second display output area.

The first display area 31 and the second display area 32 correspond to different display modules, which may be the first display module 311 and the second display module 321, respectively, wherein the first display module 311 and the second display module 321 may be of a parallel positional relationship, and may also be of a stacked positional relationship.

The first display output area 312 may be of the same size as the first display area 31; the second display output area 322 is larger than the second display area 32, for instance, when the second display module is a projection module, the second display area is a reflection unit composed of a prism, and the second display output area 322 is a spot formed by projecting onto the outer surface of the frame body. The first display output area 312 is larger than the second display output area 322 in terms of physical size.

When the first display area and the second display area are different display modules, a display mode of the first display area and the second display area may be controlled by software, thereby achieving that size of the first perceived image is smaller than that of the second perceived image; an implementation thereof may be that the display module is controlled to directly display the first display content, and the second display module is a projection module, the second perceived image 22 is obtained when the user views the second display content via the second display output area 21 as shown in FIG. 2, obviously, the second perceived image 22 can enable the user to observe content with a larger size.

The second display area is smaller than or equal to a predetermined area; the first display area is larger than the predetermined area; wherein the predetermined area may be an area value set in advance according to a practical situation, for instance, the predetermined area may be set as 2 square centimeters; or alternatively, the predetermined area is area of a cross-section of vision field of the user's eyes when the user's eyes and the electronic apparatus satisfy a predetermined distance; the predetermined distance may be set in advance according to a practical situation, for instance, the predetermined distance may be set as 1 cm, as shown in FIG. 4, it is supposed that the user's eyes can see a whole picture of the second display output area 41 when approaching the electronic apparatus, but they can only see a portion of the first display output area 42. In addition, in an actual implementation process, the predetermined distance may be set for each user individually, for instance, a user A will get a more comfortable viewing experience at 2 cm, then area of a cross-section of vision field of the user's eyes will be determined according to this predetermined distance, and further, size of the second display output area will be determined.

In this embodiment, the first display content and the second display content may be associated with each other or not associated with each other.

Figure 5:
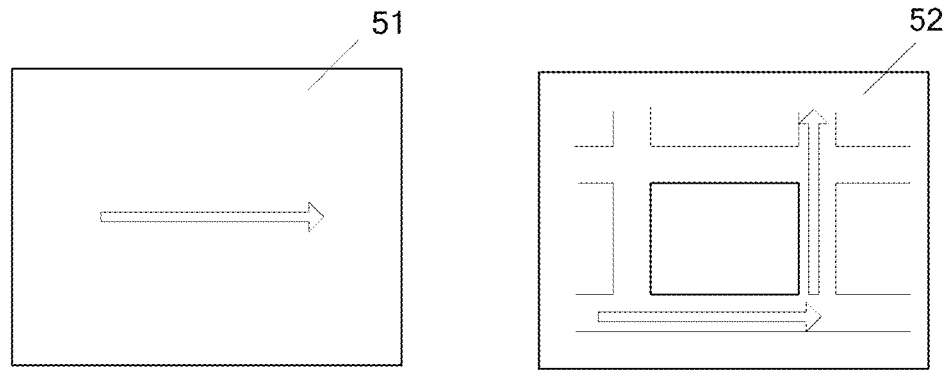
FIG. 5 is a first schematic diagram of the first display content and the second display content according to an embodiment of the present application.

Specifically, when the first display content and the second display content are associated with each other, the second display content may be an identification image that can be used to obtain the first display content, for instance, a two-dimensional code that can make the user obtain the first display content; the second display content may also be a data item by which the first display content can be operated, for instance, sharing and downloading and other virtual operation keys; alternatively, the second display content may also be a part of the first display content. For instance, as shown in FIG. 5, the second display content 52 may be map route information; accordingly, the first display content 51 may be a direction indicator to which the second display data 52 corresponds, i.e., arrow pointing, so that the user can move according to the direction indicator.

Figure 6:
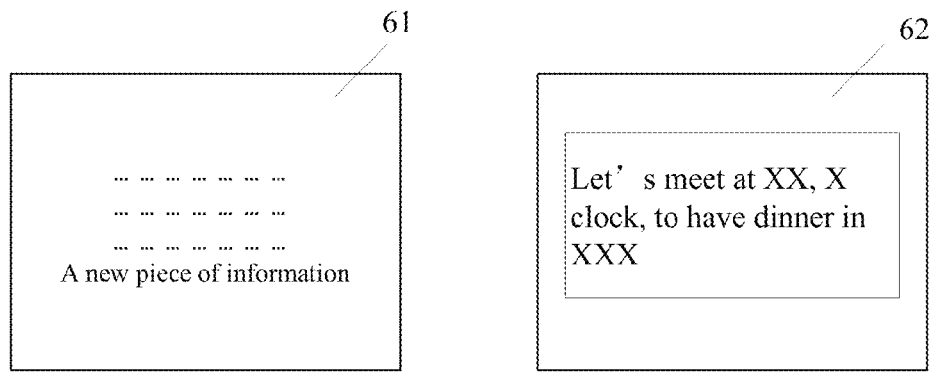
FIG. 6 is a second schematic diagram of the first display content and the second display content according to an embodiment of the present application.

Alternatively, the first display content may be a prompt of text information received by the electronic apparatus (e.g. SMS), and may also be a picture containing text (such as MMS); the second display content is the specific information to which the first display content corresponds, as shown in FIG. 6, the first display content 61 comprises "a new piece of information", then the second display content 62 is the displayed specific information.

Figure 7:
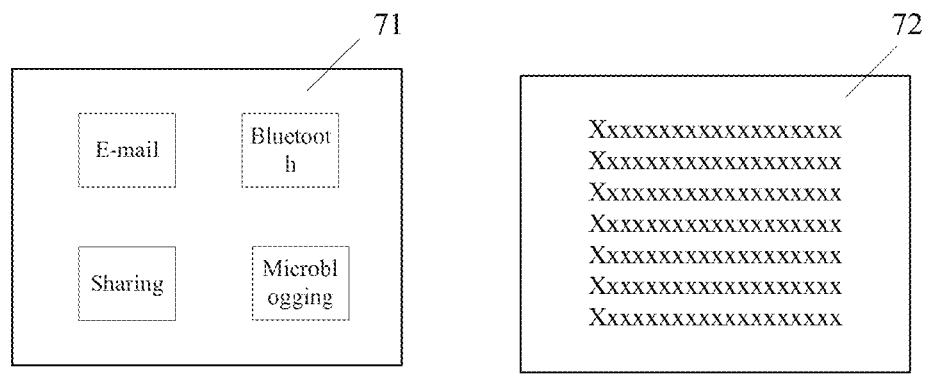
FIG. 7 is a third schematic diagram of the first display content and the second display content according to an embodiment of the present application.

Alternatively, the first display content may be information prompting a way to share the second display content, the second display content may be any information like text, image, or video; the text, image, or video may be resources stored in the electronic apparatus itself, and may also be network resources obtained online by the electronic apparatus after accessing a network. As shown in FIG. 7, the first display content 71 has four operable sharing ways "E-mail", "Bluetooth", "Sharing", "Microblog", for instance, the second display content 72 may be sent to a certain contact by email; or the second display 72 may be propagated to a corresponding electronic apparatus via Bluetooth; or the second display content 72 may be shared with friends in Wechat; or the second display content 72 may be sent to Microblog; wherein operable data items in the second display content are not limited to the aforesaid operable data items.

Alternatively, the electronic apparatus is set as a Wi-Fi hotspot by itself, then the electronic apparatus obtains a storage location (storage address) of the second display content in its own storage area, generates a two-dimensional code image based on the storage location, and regards the two-dimensional code image as the first display content. In this way, the other electronic apparatus can identify the two-dimensional code image in the first display content through a scan function (two-dimensional code scan), thereby the other electronic apparatus can obtain the second display content based on the two-dimensional code image.

Alternatively, since the first display content can be observed only when the user's eyes approach the second display output area, or after being authorized by the user, the other user's eyes approach the second display output area, while the first display content can be observed when the user's eyes are away from the first display area, i.e., all users are able to observe the first display content; a privacy level of the second display content is higher than that of the first display content, thus partial display content in the second display content can be extracted, in short, when the second display content is private content, the whole second display content can be observed only in the second interaction manner, while the first display content is displayed as a piece of prompt information. As such, it is possible to improve the privacy when using the electronic apparatus.

Accordingly, by means of adopting the above solution, the first display output area and the second display output area can be obtained on the outer surface of the frame body, the first display area is larger than the second display area, and size of the first perceived image is smaller than that of the second perceived image. Thereby, multiple areas are physically divided on the electronic apparatus, and more information can be shown on the outer surface of the frame body.

Fifth Embodiment

The embodiment of the present application provides an electronic apparatus, as shown in FIG. 1, the electronic apparatus comprises: a frame body 11, a fixing device 12, and a functional main section 13. The fixing device 12 is connected with the frame body 11 and configured to fix the electronic apparatus to a support body, and the frame body 11 and the fixing device 12 form an annular space when the electronic apparatus is fixed to the support body by the fixing device 12; the functional main section 13 comprises a display device provided within the frame body 11 and having a first display area and a second display area, the first display area being larger than the second display area; wherein when a first display content is displayed in the first display area via the display device, a first display output area corresponding to the first display area is formed on an outer surface of the frame body, so that the user obtains a first perceived image when viewing the first display output area in a first interaction manner, content of the first perceived image is the first display content; when a second display content is displayed in the second display area via the display device, a second display output area corresponding to the second display area is formed on an outer surface of the frame body, so that the user obtains a second perceived image when viewing the second display output area in a second interaction manner, content of the second perceived image is the second display content; size of the first perceived image is smaller than that of the second perceived image, the first display output area is larger than the second display output area; the first interaction manner is different from the second interaction manner.

Here, the electronic apparatus may be a smart watch; the frame body may include a dial of the smart watch. In an embodiment of the present application, the support body may be the user's wrist, and may also be the user's other body parts; of course, the support body may also be any object other than the user's body parts, for instance, it may be a prosthetic arm, etc., and may also be a hand lever in a bus or a subway train. In the embodiment of the present application, the electronic apparatus is a wearable electronic apparatus, as an embodiment, the electronic apparatus may also a smart ring. When the electronic apparatus is a smart ring, correspondingly, the support body may be a finger.

The first display area and the second display area both are a physical concept, that is, the display modules that actually show the first and second display contents.

The first display area and the second display area may correspond to the same set of display module, or correspond to two sets of display module having the same display principle, wherein the display modules are located under the dial of the frame body, the first display area may be located in the upper half portion of the dial, the second display area may be located in the lower half portion of the dial.

Alternatively, as shown in FIG. 3, the display device in the functional main body comprises a first display module 31 and a second display module 32, the first display module 31 and the second display module 32 have different display principles; wherein the first display module 31 has the first display area 311; the second display module 32 has the second display area 312; due to different display principles of the first display module 31 and the second module 32, the first interaction manner that the user uses the first display module 31 of the electronic apparatus and the second interaction manner that the user uses the second display module 32 of the electronic apparatus are different; the first interaction manner is a viewing manner that the user's eyes are away from the first display output area on the electronic apparatus; the second interaction manner is a viewing manner that the user's eyes approach the second display output area on the electronic apparatus; when the user is away from the first display output area on the electronic apparatus in the first interaction manner, the user's eyes cause the user to perceive the first perceived image; size of the first perceived image is equal to that of the first display output area; when the user approaches the second display output area on the electronic apparatus in the second interaction manner, a light beam emitted by the second display module is incident to the user's eyes, so that the user perceives the second perceived image; size of the second perceived image is larger than that of the second display output area.

The first display area 31 and the second display area 32 correspond to different display modules, which may be the first display module 311 and the second display module 321, respectively, wherein the first display module 311 and the second display module 321 may be of a parallel positional relationship, and may also be of a stacked positional relationship.

The first display output area 312 may be of the same size as the first display area 31; the second display output area 322 is larger than the second display area 32, for instance, when the second display module is a projection module, the second display area is a reflection unit composed of a prism, and the second display output area 322 is a spot formed by projecting onto the outer surface of the frame body. The first display output area 312 is larger than the second display output area 322 in terms of physical size.

When the first display area and the second display area are different display modules, a display mode of the first display area and the second display area may be controlled by software, thereby achieving that size of the first perceived image is smaller than that of the second perceived image; an implementation thereof may be that the display module is controlled to directly display the first display content, and the second display module is a projection module, the second perceived image 22 is obtained when the user views the second display content via the second display output area 21 as shown in FIG. 2, obviously, the second perceived image 22 can enable the user to observe content with a larger size.

The second display area is smaller than or equal to a predetermined area; the first display area is larger than the predetermined area; wherein the predetermined area may be an area value set in advance according to a practical situation, for instance, the predetermined area may be set as 2 square centimeters; or alternatively, the predetermined area is area of a cross-section of vision field of the user's eyes when the user's eyes and the electronic apparatus satisfy a predetermined distance; the predetermined distance may be set in advance according to a practical situation, for instance, the predetermined distance may be set as 1 cm, as shown in FIG. 4, it is supposed that the user's eyes can see a whole picture of the second display output area 41 when approaching the electronic apparatus, but they can only see a portion of the first display output area 42. In addition, in an actual implementation process, the predetermined distance may be set for each user individually, for instance, a user A will get a more comfortable viewing experience at 2 cm, then area of a cross-section of vision field of the user's eyes will be determined according to this predetermined distance, and further, size of the second display output area will be determined.

The functional main section further comprises a sensor and a control circuit; the sensor is configured to generate a detection signal of an interaction manner between the user wearing the electronic apparatus and the electronic apparatus; the sensor is connected with the control circuit, the control circuit is configured to enable the first display module and control the first display content to be displayed in the first display area of the first display module, when determining that the user wearing the electronic apparatus and the electronic apparatus are in the first interaction manner according to the detection signal; and/or the control circuit is configured to enable the second display module and control the second display content to be displayed in the second display area of the second display module, when determining that the user wearing the electronic apparatus and the electronic apparatus are in the second interaction manner according to the detection signal.

The sensor can detect a distance between the user's eyes and the electronic apparatus, regard this distance as a detection signal of the interaction manner, the sensor may be an infrared sensor, and detect a distance between the electronic apparatus and the user by infrared; accordingly, the control circuit determines whether the distance between the user's eyes and the electronic apparatus is greater than a predetermined distance, it is determined that the user wearing the electronic apparatus and the electronic apparatus are in the first interaction manner when the distance is greater than the predetermined distance, it is determined that the user wearing the electronic apparatus and the electronic apparatus are in the second interaction manner when the distance is not greater than the predetermined distance, for instance, as shown in FIG. 4, when the user is close enough to the electronic apparatus, the control circuit determines to switch to the second interaction manner.

Figure 8A:
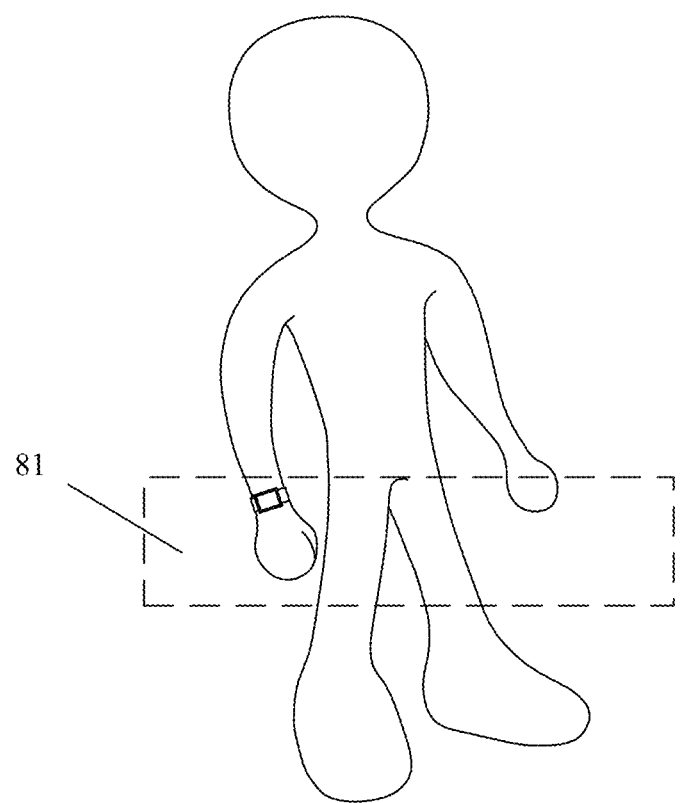
FIG. 8a is a first schematic diagram of a relative area of the electronic apparatus according to an embodiment of the present application.
Figure 8B:
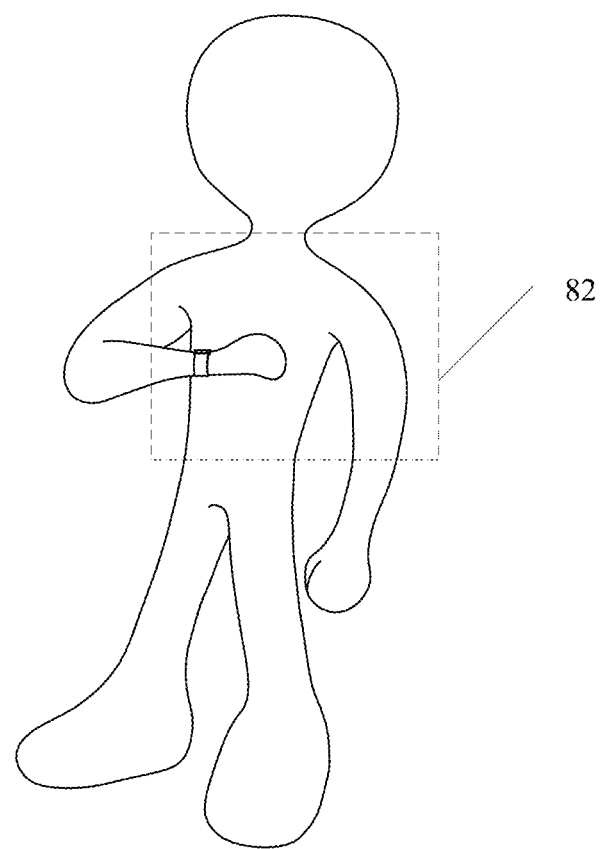
FIG. 8b is a second schematic diagram of a relative area of the electronic apparatus according to an embodiment of the present application.
Figure 8C:
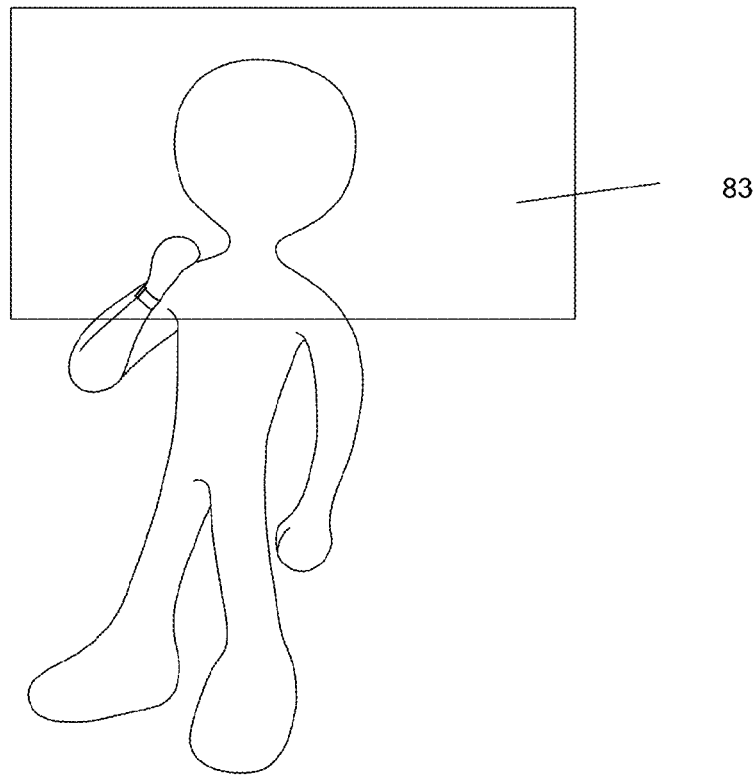
FIG. 8c is a third schematic diagram of a relative area of the electronic apparatus according to an embodiment of the present application.

Alternatively, the sensor provided by another embodiment of the present application is configured to sense a relative position between the electronic apparatus and a viewer wearing the electronic apparatus, and regard this relative position as a detection signal of the interaction manner, the sensor may be a gravity sensor. For instance, as shown in FIG. 8a, when the relative position between the electronic apparatus and the viewer wearing the electronic apparatus as sensed by the sensor satisfies a first relative area 81, it represents that the electronic apparatus is located in a side area of the viewer's body; as shown in FIG. 8b, when the relative position between the electronic apparatus and the viewer wearing the electronic apparatus as sensed by the sensor satisfies a second relative area 82, it represents that that the electronic apparatus is located in an area in front of chest of the viewer's body; as shown in FIG. 8c, when the relative position between the electronic apparatus and the viewer wearing the electronic apparatus as sensed by the sensor satisfies a third relative area 83, it represents that that the electronic apparatus is located in an area in front of head of the viewer's body. In a practical application process of the electronic apparatus provided by the embodiment of the present application, when the relative position between the electronic apparatus and the viewer wearing the electronic apparatus as sensed by the sensor satisfies the first relative area, the electronic apparatus controls the first display module and the second display module in a low power consumption state (an Off state or a Standby state); when the relative position between the electronic apparatus and the viewer wearing the electronic apparatus as sensed by the sensor satisfies the second relative area, the electronic apparatus determines it is in the first interaction manner, controls the first display module in an active state and controls the second display module to maintain in the low power consumption state; when the relative position between the electronic apparatus and the viewer wearing the electronic apparatus as sensed by the sensor satisfies the third relative area, the electronic apparatus determines to switch to the second interaction manner, and at least controls the second display module in the active state, however, in practice, it is possible to simultaneously control the first display module in the low power consumption state; when the relative position between the electronic apparatus and the viewer wearing the electronic apparatus as sensed by the sensor satisfies the third relative area, it is possible to simultaneously control the first display module in the low power consumption state; likewise, when the relative position between the electronic apparatus and the viewer wearing the electronic apparatus as sensed by the sensor satisfies the third relative area, the first display module is maintained in the active state (the active state in this case is controlling the first display module in the active state in the second relative area). When the relative position between the electronic apparatus and the viewer wearing the electronic apparatus as sensed by the sensor satisfies the first relative area again, the electronic apparatus controls the first display module and the second display module to switch to the low power consumption state (an Off state or a Standby state).

The two display modules in the electronic apparatus provided above may have various using states when being used. Now, description is provided with the electronic apparatus as a smart watch worn on the wrist as example, for instance, the user is walking, at this moment the user's arms are drooping naturally, in this case, the first display module and the second display module of the electronic apparatus may both in a low power consumption state like an Off state or a Standby state etc., the Off state or the Standby state can save power to extend using time of the electronic apparatus; when the user's arms are drooping naturally, it is considered that the electronic apparatus is in the first relative area, that is, the first relative area indicates a relative positional relationship between the user and the electronic apparatus, i.e., the side area of the user's body.

Next, the user wants to check time at a certain moment during walking, at this moment the user will raise an arm, it is assumed that the electronic apparatus is in the second relative area when the user is raising the arm (i.e., area in front of chest of the user's body); in this case, the electronic apparatus detects itself in the second relative area, enables the first display module (the first display module will be turned on or waken up), and then displays time to the user; or prompt information is displayed to the user by the first display module.

At this time, if the user wants to see data content more associated with the prompt information, then he/she will continue to approach the electronic apparatus to the eyes, it is assumed that in this case the electronic apparatus is in the third relative area (i.e., area in front of head of the user's body), that is, when the electronic apparatus is in the third relative area, the electronic apparatus will enable the second display module, when the user's eyes are close to a light spot 200 formed on a protective layer after enabling the second display module, the user can view the associated data content by the second display module, through the light spot 200.

Figure 9:
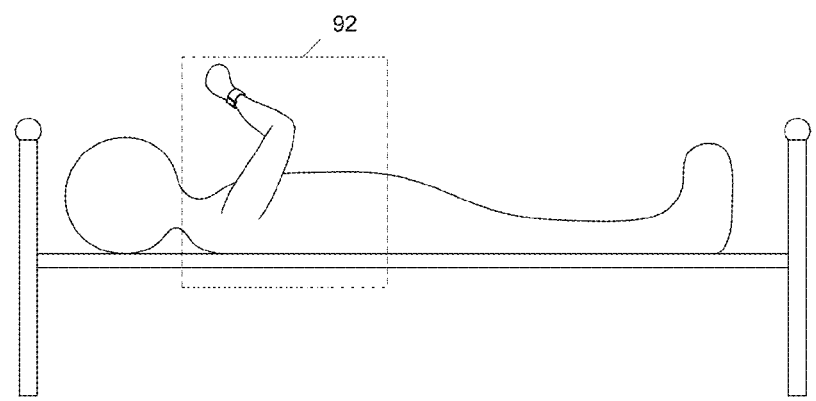
FIG. 9 is a schematic diagram of a scenario of obtaining a relative area of the electronic apparatus according to an embodiment of the present application.

As will be appreciated, the above scenario does not make definition to applying of the present application, using scenario of the present application may further include a user lying in bed, for instance, as shown in FIG. 9, when the user wants to view the information, he/she can raise the hand to the second relative area 92, then the sensor will obtain detection data of the interaction manner, and further the control circuit will determine to enter the first interaction manner based on the detection data, control the first display module to be turned on to display the first display content; and further, if the user wants to view detailed information related to the first display content, that is, he/she wants to view the second display content, he/she can raise the arm to the third relative area (not shown in the figure), the control circuit determines to enter the second interaction manner, controls the second display module to be turned on, and meanwhile the first display module may be turned off, or may not be turned off.

In addition, the sensor may also be a touch sensor, which obtains detection information the interaction manner by detecting a touch operation of the user on an outer surface of the frame body; for instance, when it is detected that the touch operation of the user is sliding from the first display area to the second display area, the control circuit determines to enable the second display module.

The above three types of implementations, that is, detecting by the sensor a distance between the user's eyes and the electronic apparatus as a detection signal of the interaction manner, detecting by the sensor a relative area of the electronic apparatus relative to the user as a detection signal of the interaction manner, detecting by the sensor the touch operation of the user as a detection signal of the interaction manner, is not alternative optionally, that is, the three types manner may be used in combination or alone, or in pairwise combination. In this way, it is possible to determine whether to trigger the first interaction manner or the second interaction manner by detecting the position of the electronic apparatus, which enhances user experience with regard to the electronic apparatus.

In this embodiment, the first display content and the second display content may be associated with each other or not associated with each other.

Specifically, when the first display content and the second display content are associated with each other, the second display content may be an identification image that can be used to obtain the first display content, for instance, a two-dimensional code that can make the user obtain the first display content; the second display content may also be a data item by which the first display content can be operated, for instance, sharing and downloading and other virtual operation keys; alternatively, the second display content may also be a part of the first display content. For instance, as shown in FIG. 5, the second display content 52 may be map route information; accordingly, the first display content 51 may be a direction indicator to which the second display data 52 corresponds, i.e., arrow pointing, so that the user can move according to the direction indicator.

Alternatively, the first display content may be a prompt of text information received by the electronic apparatus (e.g. SMS), and may also be a picture containing text (such as MMS); the second display content is the specific information to which the first display content corresponds, as shown in FIG. 6, the first display content 61 comprises "a new piece of information", then the second display content 62 is the displayed specific information.

Alternatively, the first display content may be information prompting a way to share the second display content, the second display content may be any information like text, image, or video; the text, image, or video may be resources stored in the electronic apparatus itself, and may also be network resources obtained online by the electronic apparatus after accessing a network. As shown in FIG. 7, the first display content 71 has four operable sharing ways "E-mail", "Bluetooth", "Sharing", "Microblog", for instance, the second display content 72 may be sent to a certain contact by email; or the second display 72 may be propagated to a corresponding electronic apparatus via Bluetooth; or the second display content 72 may be shared with friends in Wechat; or the second display content 72 may be sent to Microblog; wherein operable data items in the second display content are not limited to the aforesaid operable data items.

Alternatively, the electronic apparatus is set as a Wi-Fi hotspot by itself, then the electronic apparatus obtains a storage location (storage address) of the second display content in its own storage area, generates a two-dimensional code image based on the storage location, and regards the two-dimensional code image as the first display content. In this way, the other electronic apparatus can identify the two-dimensional code image in the first display content through a scan function (two-dimensional code scan), thereby the other electronic apparatus can obtain the second display content based on the two-dimensional code image.

Alternatively, since the first display content can be observed only when the user's eyes approach the second display output area, or after being authorized by the user, the other user's eyes approach the second display output area, while the first display content can be observed when the user's eyes are away from the first display area, i.e., all users are able to observe the first display content; a privacy level of the second display content is higher than that of the first display content, thus partial display content in the second display content can be extracted, in short, when the second display content is private content, the whole second display content can be observed only in the second interaction manner, while the first display content is displayed as a piece of prompt information. As such, it is possible to improve the privacy when using the electronic apparatus.

Accordingly, by means of adopting the above solution, the first display output area and the second display output area can be obtained on the outer surface of the frame body, the first display area is larger than the second display area, and size of the first perceived image is smaller than that of the second perceived image. Thereby, multiple areas are physically divided on the electronic apparatus, and more information can be shown on the outer surface of the frame body.

Sixth Embodiment

The embodiment of the present application provides an electronic apparatus, as shown in FIG. 1, the electronic apparatus comprises: a frame body 11, a fixing device 12, and a functional main section 13. The fixing device 12 is connected with the frame body 11 and configured to fix the electronic apparatus to a support body, and the frame body 11 and the fixing device 12 form an annular space when the electronic apparatus is fixed to the support body by the fixing device 12; the functional main section 13 comprises a display device provided within the frame body 11 and having a first display area and a second display area, the first display area being larger than the second display area; wherein when a first display content is displayed in the first display area via the display device, a first display output area corresponding to the first display area is formed on an outer surface of the frame body, so that the user obtains a first perceived image when viewing the first display output area in a first interaction manner, content of the first perceived image is the first display content; when a second display content is displayed in the second display area via the display device, a second display output area corresponding to the second display area is formed on an outer surface of the frame body, so that the user obtains a second perceived image when viewing the second display output area in a second interaction manner, content of the second perceived image is the second display content; size of the first perceived image is smaller than that of the second perceived image, the first display output area is larger than the second display output area; the first interaction manner is different from the second interaction manner.

Here, the electronic apparatus may be a smart watch; the frame body may include a dial of the smart watch. In an embodiment of the present application, the support body may be the user's wrist, and may also be the user's other body parts; of course, the support body may also be any object other than the user's body parts, for instance, it may be a prosthetic arm, etc., and may also be a hand lever in a bus or a subway train. In the embodiment of the present application, the electronic apparatus is a wearable electronic apparatus, as an embodiment, the electronic apparatus may also a smart ring. When the electronic apparatus is a smart ring, correspondingly, the support body may be a finger.

The first display area and the second display area both are a physical concept, that is, the display modules that actually show the first and second display contents.

The first display area and the second display area may correspond to the same set of display module, or correspond to two sets of display module having the same display principle, wherein the display modules are located under the dial of the frame body, the first display area may be located in the upper half portion of the dial, the second display area may be located in the lower half portion of the dial.

Alternatively, as shown in FIG. 3, the display device in the functional main body comprises a first display module 31 and a second display module 32, the first display module 31 and the second display module 32 have different display principles; wherein the first display module 31 has the first display area 311; the second display module 32 has the second display area 312; due to different display principles of the first display module 31 and the second module 32, the first interaction manner that the user uses the first display module 31 of the electronic apparatus and the second interaction manner that the user uses the second display module 32 of the electronic apparatus are different; the first interaction manner is a viewing manner that the user's eyes are away from the first display output area on the electronic apparatus; the second interaction manner is a viewing manner that the user's eyes approach the second display output area on the electronic apparatus; when the user is away from the first display output area on the electronic apparatus in the first interaction manner, the user's eyes cause the user to perceive the first perceived image; size of the first perceived image is equal to that of the first display output area; when the user approaches the second display output area on the electronic apparatus in the second interaction manner, a light beam emitted by the second display module is incident to the user's eyes, so that the user perceives the second perceived image; size of the second perceived image is larger than that of the second display output area.

The first display area 31 and the second display area 32 correspond to different display modules, which may be the first display module 311 and the second display module 321, respectively, wherein the first display module 311 and the second display module 321 may be of a parallel positional relationship, and may also be of a stacked positional relationship.

The first display output area 312 may be of the same size as the first display area 31; the second display output area 322 is larger than the second display area 32, for instance, when the second display module is a projection module, the second display area is a reflection unit composed of a prism, and the second display output area 322 is a spot formed by projecting onto the outer surface of the frame body. The first display output area 312 is larger than the second display output area 322 in terms of physical size.

When the first display area and the second display area are different display modules, a display mode of the first display area and the second display area may be controlled by software, thereby achieving that size of the first perceived image is smaller than that of the second perceived image; an implementation thereof may be that the display module is controlled to directly display the first display content, and the second display module is a projection module, the second perceived image 22 is obtained when the user views the second display content via the second display output area 21 as shown in FIG. 2, obviously, the second perceived image 22 can enable the user to observe content with a larger size.

The second display area is smaller than or equal to a predetermined area; the first display area is larger than the predetermined area;

wherein the predetermined area may be an area value set in advance according to a practical situation, for instance, the predetermined area may be set as 2 square centimeters; or alternatively, the predetermined area is area of a cross-section of vision field of the user's eyes when the user's eyes and the electronic apparatus satisfy a predetermined distance; the predetermined distance may be set in advance according to a practical situation, for instance, the predetermined distance may be set as 1 cm, as shown in FIG. 4, it is supposed that the user's eyes can see a whole picture of the second display output area 41 when approaching the electronic apparatus, but they can only see a portion of the first display output area 42. In addition, in an actual implementation process, the predetermined distance may be set for each user individually, for instance, a user A will get a more comfortable viewing experience at 2 cm, then area of a cross-section of vision field of the user's eyes will be determined according to this predetermined distance, and further, size of the second display output area will be determined.

The functional main section further comprises a sensor and a control circuit; the sensor is configured to generate a detection signal of an interaction manner between the user wearing the electronic apparatus and the electronic apparatus; the sensor is connected with the control circuit, the control circuit is configured to enable the first display module and control the first display content to be displayed in the first display area of the first display module, when determining that the user wearing the electronic apparatus and the electronic apparatus are in the first interaction manner according to the detection signal; and/or the control circuit is configured to enable the second display module and control the second display content to be displayed in the second display area of the second display module, when determining that the user wearing the electronic apparatus and the electronic apparatus are in the second interaction manner according to the detection signal.

The sensor can detect a distance between the user's eyes and the electronic apparatus, regard this distance as a detection signal of the interaction manner, the sensor may be an infrared sensor, and detect a distance between the electronic apparatus and the user by infrared; accordingly, the control circuit determines whether the distance between the user's eyes and the electronic apparatus is greater than a predetermined distance, it is determined that the user wearing the electronic apparatus and the electronic apparatus are in the first interaction manner when the distance is greater than the predetermined distance, it is determined that the user wearing the electronic apparatus and the electronic apparatus are in the second interaction manner when the distance is not greater than the predetermined distance, for instance, as shown in FIG. 4, when the user is close enough to the electronic apparatus, the control circuit determines to switch to the second interaction manner.

Alternatively, the sensor provided by another embodiment of the present application is configured to sense a relative position between the electronic apparatus and a viewer wearing the electronic apparatus, and regard this relative position as a detection signal of the interaction manner, the sensor may be a gravity sensor. For instance, as shown in FIG. 8*a*, when the relative position between the electronic apparatus and the viewer wearing the electronic apparatus as sensed by the sensor satisfies a first relative area 81, it represents that the electronic apparatus is located in a side area of the viewer's body; as shown in FIG. 8*b*, when the relative position between the electronic apparatus and the viewer wearing the electronic apparatus as sensed by the sensor satisfies a second relative area 82, it represents that that the electronic apparatus is located in an area in front of chest of the viewer's body; as shown in FIG. 8*c*, when the relative position between the electronic apparatus and the viewer wearing the electronic apparatus as sensed by the sensor satisfies a third relative area 83, it represents that that the electronic apparatus is located in an area in front of head of the viewer's body. In a practical application process of the electronic apparatus provided by the embodiment of the present application, when the relative position between the electronic apparatus and the viewer wearing the electronic apparatus as sensed by the sensor satisfies the first relative area, the electronic apparatus controls the first display module and the second display module in a low power consumption state (an Off state or a Standby state); when the relative position between the electronic apparatus and the viewer wearing the electronic apparatus as sensed by the sensor satisfies the second relative area, the electronic apparatus determines it is in the first interaction manner, controls the first display module in an active state and controls the second display module to maintain in the low power consumption state; when the relative position between the electronic apparatus and the viewer wearing the electronic apparatus as sensed by the sensor satisfies the third relative area, the electronic apparatus determines to switch to the second interaction manner, and at least controls the second display module in the active state, however, in practice, it is possible to simultaneously control the first display module in the low power consumption state; when the relative position between the electronic apparatus and the viewer wearing the electronic apparatus as sensed by the sensor satisfies the third relative area, it is possible to simultaneously control the first display module in the low power consumption state; likewise, when the relative position between the electronic apparatus and the viewer wearing the electronic apparatus as sensed by the sensor satisfies the third relative area, the first display module is maintained in the active state (the active state in this case is controlling the first display module in the active state in the second relative area). When the relative position between the electronic apparatus and the viewer wearing the electronic apparatus as sensed by the sensor satisfies the first relative area again, the electronic apparatus controls the first display module and the second display module to switch to the low power consumption state (an Off state or a Standby state).

The two display modules in the electronic apparatus provided above may have various using states when being used. Now, description is provided with the electronic apparatus as a smart watch worn on the wrist as example, for instance, the user is walking, at this moment the user's arms are drooping naturally, in this case, the first display module and the second display module of the electronic apparatus may both in a low power consumption state like an Off state or a Standby state etc., the Off state or the Standby state can save power to extend using time of the electronic apparatus; when the user's arms are drooping naturally, it is considered that the electronic apparatus is in the first relative area, that is, the first relative area indicates a relative positional relationship between the user and the electronic apparatus, i.e., the side area of the user's body.

Next, the user wants to check time at a certain moment during walking, at this moment the user will raise an arm, it is assumed that the electronic apparatus is in the second relative area when the user is raising the arm (i.e., area in front of chest of the user's body); in this case, the electronic apparatus detects itself in the second relative area, enables the first display module (the first display module will be turned on or waken up), and then displays time to the user; or prompt information is displayed to the user by the first display module.

At this time, if the user wants to see data content more associated with the prompt information, then he/she will continue to approach the electronic apparatus to the eyes, it is assumed that in this case the electronic apparatus is in the third relative area (i.e., area in front of head of the user's body), that is, when the electronic apparatus is in the third relative area, the electronic apparatus will enable the second display module, when the user's eyes are close to a light spot 200 formed on a protective layer after enabling the second display module, the user can view the associated data content by the second display module, through the light spot 200.

As will be appreciated, the above scenario does not make definition to applying of the present application, using scenario of the present application may further include a user lying in bed, for instance, as shown in FIG. 9, when the user wants to view the information, he/she can raise the hand to the second relative area 92, then the sensor will obtain detection data of the interaction manner, and further the control circuit will determine to enter the first interaction manner based on the detection data, control the first display module to be turned on to display the first display content; and further, if the user wants to view detailed information related to the first display content, that is, he/she wants to view the second display content, he/she can raise the arm to the third relative area (not shown in the figure), the control circuit determines to enter the second interaction manner, controls the second display module to be turned on, and meanwhile the first display module may be turned off, or may not be turned off.

Alternatively, the sensor may also be a touch sensor, which obtains detection information the interaction manner by detecting a touch operation of the user on an outer surface of the frame body; for instance, when it is detected that the touch operation of the user is sliding from the first display area to the second display area, the control circuit determines to enable the second display module.

The above three types of implementations, that is, detecting by the sensor a distance between the user's eyes and the electronic apparatus as a detection signal of the interaction manner, detecting by the sensor a relative area of the electronic apparatus relative to the user as a detection signal of the interaction manner, detecting by the sensor the touch operation of the user as a detection signal of the interaction manner, is not alternative optionally, that is, the three types may be used in combination or alone, or in pairwise combination. In this way, it is possible to determine whether to trigger the first interaction manner or the second interaction manner by detecting the position of the electronic apparatus, which enhances user experience with regard to the electronic apparatus.

In this embodiment, the first display content and the second display content may be associated with each other or not associated with each other.

Specifically, when the first display content and the second display content are associated with each other, the second display content may be an identification image that can be used to obtain the first display content, for instance, a two-dimensional code that can make the user obtain the first display content; the second display content may also be a data item by which the first display content can be operated, for instance, sharing and downloading and other virtual operation keys; alternatively, the second display content may also be a part of the first display content. For instance, as shown in FIG. 5, the second display content 52 may be map route information; accordingly, the first display content 51 may be a direction indicator to which the second display data 52 corresponds, i.e., arrow pointing, so that the user can move according to the direction indicator.

Alternatively, the first display content may be a prompt of text information received by the electronic apparatus (e.g. SMS), and may also be a picture containing text (such as MMS); the second display content is the specific information to which the first display content corresponds, as shown in FIG. 6, the first display content 61 comprises "a new piece of information", then the second display content 62 is the displayed specific information.

Alternatively, the first display content may be information prompting a way to share the second display content, the second display content may be any information like text, image, or video; the text, image, or video may be resources stored in the electronic apparatus itself, and may also be network resources obtained online by the electronic apparatus after accessing a network. As shown in FIG. 7, the first display content 71 has four operable sharing ways "E-mail", "Bluetooth", "Sharing", "Microblog", for instance, the second display content 72 may be sent to a certain contact by email; or the second display 72 may be propagated to a corresponding electronic apparatus via Bluetooth; or the second display content 72 may be shared with friends in Wechat; or the second display content 72 may be sent to Microblog; wherein operable data items in the second display content are not limited to the aforesaid operable data items.

Alternatively, the electronic apparatus is set as a Wi-Fi hotspot by itself, then the electronic apparatus obtains a storage location (storage address) of the second display content in its own storage area, generates a two-dimensional code image based on the storage location, and regards the two-dimensional code image as the first display content. In this way, the other electronic apparatus can identify the two-dimensional code image in the first display content through a scan function (two-dimensional code scan), thereby the other electronic apparatus can obtain the second display content based on the two-dimensional code image.

Alternatively, since the first display content can be observed only when the user's eyes approach the second display output area, or after being authorized by the user, the other user's eyes approach the second display output area, while the first display content can be observed when the user's eyes are away from the first display area, i.e., all users are able to observe the first display content; a privacy level of the second display content is higher than that of the first display content, thus partial display content in the second display content can be extracted, in short, when the second display content is private content, the whole second display content can be observed only in the second interaction manner, while the first display content is displayed as a piece of prompt information. As such, it is possible to improve the privacy when using the electronic apparatus.

Power consumption of the first display module is smaller than that of the second display module.

The first display module may be a regular module commonly used currently, like an LED display module or an LCD display module; the second display module is an optical projection system, a first portion of the second display module is an light guide optical component, a second portion of the second display module is a display component and a collimating component; the light guide optical component is made from transparent material; the display component is configured to display and output the second display content, and project a first beam in a mode of light beam to be output; the collimating component is configured to process and transform the first beam projected and output in the mode of light beam into a second light beam to be output; the light guide optical component is configured to propagate the second beam in the transparent material from which the light guide optical component is made, the light guide optical component comprises a reflection unit provided in a specific area of an overstep portion and configured to change a propagation direction of the second beam in the transparent material, so as to project in the second direction; the second direction is consistent with an output direction of the first display content in the first display area of the first display module; the specific area in which the reflection unit is provided of the light guide optical component is the second display area of the second display module.

Figure 10:
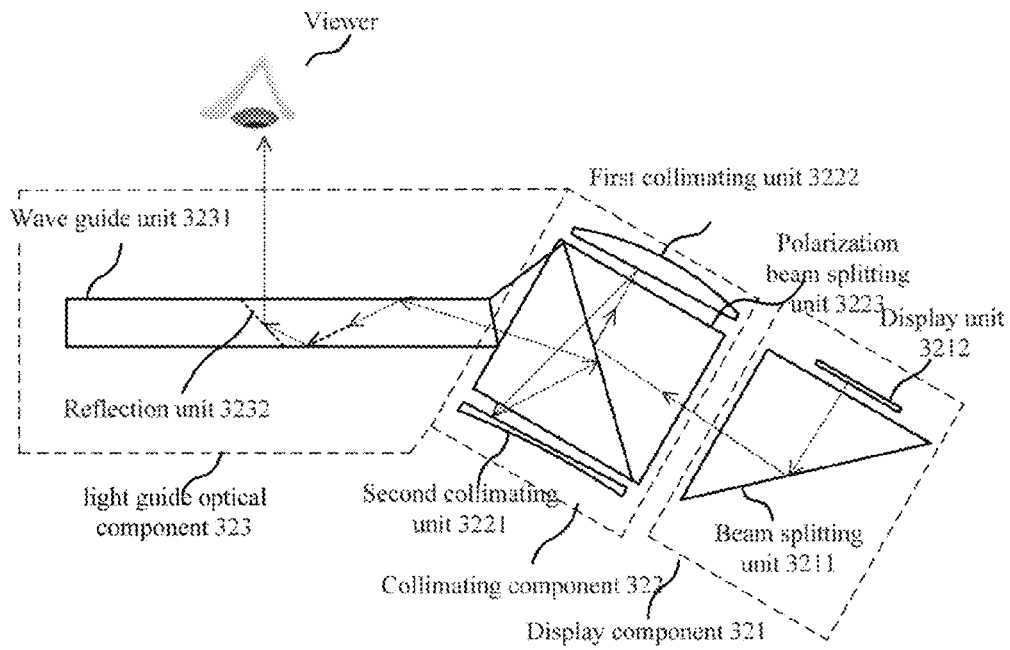
FIG. 10 is a first structural schematic diagram of the second display module according to an embodiment of the present application.
Figure 11:
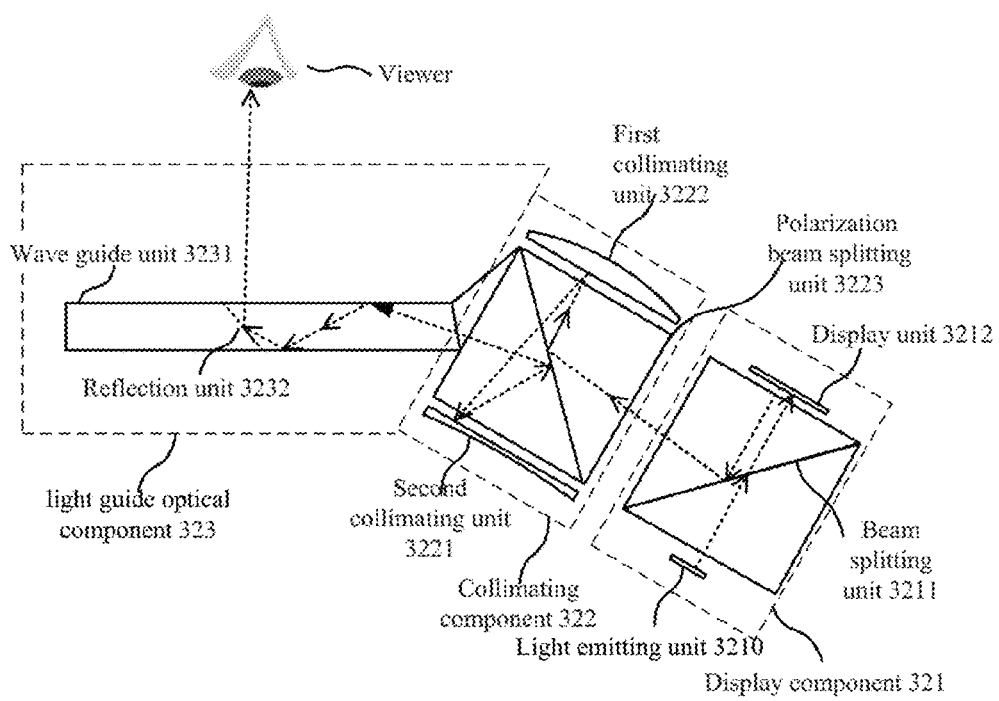
FIG. 11 is a second structural schematic diagram of the second display module according to an embodiment of the present application.

The second display module 32 in FIG. 3 will be described in detail below. FIG. 10 is a first structural schematic diagram of the second display module according to an embodiment of the present application, FIG. 11 is a second structural schematic diagram of the second display module according to an embodiment of the present application, as shown in FIGS. 10 and 11, the display component 321 comprises a beam splitting unit 3211 and a display unit 3212, the collimating component 322 comprises a second collimating unit 3221 and a first collimating unit 3222, and a polarization beam splitting unit 3223, the light guide optical component 323 comprises a wave guide unit 3231 and a reflection unit 3232. The display component 321 in FIG. 5-2 further comprises a light emitting unit 3210. The collimating component 322 processes and transforms the first beam projected and output in the mode of light beam into a second light beam to be output to the second light guide optical component 323.

In particular, the collimating component 322 comprises a second collimating unit 3221 and a first collimating unit 3222, and a polarization beam splitting unit 3223 provided between the second collimating unit 3221 and the first collimating unit 3222, the first beam output from the display component is initially reflected by the polarization beam splitting unit 3223 to the first collimating unit 3222, and thereafter collimated by the first collimating unit 3222 and the second collimating unit 3221, and then passes through the polarization beam splitting unit 3223 to be exited as the second beam.

Here, the first collimating unit 3222 and the second collimating unit 3221 may be a single lens or a lens group as needed by design.

The light guide optical component 323 is configured to propagate the second beam in the material from which the light guide optical component is made, and finally propagate the same to the viewer; the light guide optical component 323 comprises a waveguide unit 3231 and a reflection unit 3232, the coming second beam can be controlled by setting the position and angle of the reflection unit 3232 and guided to the specific position to be exited. In a first case, the collimating component 322 and the display component 321 are at a first side relative to a plane on which the wave guide unit 3231 is located, when the reflection unit 3132 is set, the second beam may be exited towards a second side relative to the plane on which the wave guide unit 3231 is located, the first side and the second side are opposite sides relative to the plane on which the wave guide unit 3231 is located.

Specifically, when the second display module is for example applied to a smart watch, the configuration example as described above may be adopted, so that the second beam is exited towards the second side, that is, the second beam is exited towards the eyes of the user wearing and viewing the strap-type electronic apparatus. In further detail, it is possible to configure the exiting direction of the second display module according to viewing requirement, for instance, the reflection unit 3232 may be controlled to rotate, so as to control the exiting direction of the reflection unit 3232, thus achieving switch of bidirectional display of the second display module. In the embodiment of the present application, the reflection unit 3232 may be a single prism or a prism group as needed by design.

In the embodiment of the present application, the first display module has a first display output area, as described above, the first display module is a first display screen, thus physical size of the first display screen is consistent with size of the first display output area;

The second display module has a second display output area, the second display output area is a specific area of an overstep portion in which the reflection unit is provided. In general, physical size of the reflection unit seen by the viewer (user) is not less than size of the second display output area, and size of the display unit in the second display module is smaller than that of the second display output area. It should be noted that, FIG. 10 or 11 is only to help those skilled in the art to understand the technical solution of the present application, rather than the state when the electronic apparatus provided by the embodiment of the present application is being used; for instance, when the electronic apparatus is being used, it is fixed to the support body, when the support body is the wrist, the user raises the arm will place the electronic apparatus in front of the eyes, thus it can be seen that the user can view the information provided by the electronic apparatus at a front angle during the time of using.

Accordingly, by means of adopting the above solution, the first display output area and the second display output area can be obtained on the outer surface of the frame body, the first display area is larger than the second display area, and size of the first perceived image is smaller than that of the second perceived image. Thereby, multiple areas are physically divided on the electronic apparatus, and more information can be shown on the outer surface of the frame body.

Seventh Embodiment

The embodiment of the present application provides an electronic apparatus, as shown in FIG. 1, the electronic apparatus comprises: a frame body 11, a fixing device 12, and a functional main section 13. The fixing device 12 is connected with the frame body 11 and configured to fix the electronic apparatus to a support body, and the frame body 11 and the fixing device 12 form an annular space when the electronic apparatus is fixed to the support body by the fixing device 12; the functional main section 13 comprises a display device provided within the frame body 11 and having a first display area and a second display area, the first display area being larger than the second display area; wherein when a first display content is displayed in the first display area via the display device, a first display output area corresponding to the first display area is formed on an outer surface of the frame body, so that the user obtains a first perceived image when viewing the first display output area in a first interaction manner, content of the first perceived image is the first display content; when a second display content is displayed in the second display area via the display device, a second display output area corresponding to the second display area is formed on an outer surface of the frame body, so that the user obtains a second perceived image when viewing the second display output area in a second interaction manner, content of the second perceived image is the second display content; size of the first perceived image is smaller than that of the second perceived image, the first display output area is larger than the second display output area; the first interaction manner is different from the second interaction manner.

Here, the electronic apparatus may be a smart watch; the frame body may include a dial of the smart watch. In an embodiment of the present application, the support body may be the user's wrist, and may also be the user's other body parts; of course, the support body may also be any object other than the user's body parts, for instance, it may be a prosthetic arm, etc., and may also be a hand lever in a bus or a subway train. In the embodiment of the present application, the electronic apparatus is a wearable electronic apparatus, as an embodiment, the electronic apparatus may also a smart ring. When the electronic apparatus is a smart ring, correspondingly, the support body may be a finger.

The first display area and the second display area both are a physical concept, that is, the display modules that actually show the first and second display contents.

The first display area and the second display area may correspond to the same set of display module, or correspond to two sets of display module having the same display principle, wherein the display modules are located under the dial of the frame body, the first display area may be located in the upper half portion of the dial, the second display area may be located in the lower half portion of the dial.

Alternatively, as shown in FIG. 3, the display device in the functional main body comprises a first display module 31 and a second display module 32, the first display module 31 and the second display module 32 have different display principles; wherein the first display module 31 has the first display area 311; the second display module 32 has the second display area 312; due to different display principles of the first display module 31 and the second module 32, the first interaction manner that the user uses the first display module 31 of the electronic apparatus and the second interaction manner that the user uses the second display module 32 of the electronic apparatus are different; the first interaction manner is a viewing manner that the user's eyes are away from the first display output area on the electronic apparatus; the second interaction manner is a viewing manner that the user's eyes approach the second display output area on the electronic apparatus; when the user is away from the first display output area on the electronic apparatus in the first interaction manner, the user's eyes cause the user to perceive the first perceived image; size of the first perceived image is equal to that of the first display output area; when the user approaches the second display output area on the electronic apparatus in the second interaction manner, a light beam emitted by the second display module is incident to the user's eyes, so that the user perceives the second perceived image; size of the second perceived image is larger than that of the second display output area.

The first display area 31 and the second display area 32 correspond to different display modules, which may be the first display module 311 and the second display module 321, respectively, wherein the first display module 311 and the second display module 321 may be of a parallel positional relationship, and may also be of a stacked positional relationship.

The first display output area 312 may be of the same size as the first display area 31; the second display output area 322 is larger than the second display area 32, for instance, when the second display module is a projection module, the second display area is a reflection unit composed of a prism, and the second display output area 322 is a spot formed by projecting onto the outer surface of the frame body. The first display output area 312 is larger than the second display output area 322 in terms of physical size.

When the first display area and the second display area are different display modules, a display mode of the first display area and the second display area may be controlled by software, thereby achieving that size of the first perceived image is smaller than that of the second perceived image; an implementation thereof may be that the display module is controlled to directly display the first display content, and the second display module is a projection module, the second perceived image 22 is obtained when the user views the second display content via the second display output area 21 as shown in FIG. 2, obviously, the second perceived image 22 can enable the user to observe content with a larger size.

The second display area is smaller than or equal to a predetermined area; the first display area is larger than the predetermined area; wherein the predetermined area may be an area value set in advance according to a practical situation, for instance, the predetermined area may be set as 2 square centimeters; or alternatively, the predetermined area is area of a cross-section of vision field of the user's eyes when the user's eyes and the electronic apparatus satisfy a predetermined distance; the predetermined distance may be set in advance according to a practical situation, for instance, the predetermined distance may be set as 1 cm, as shown in FIG. 4, it is supposed that the user's eyes can see a whole picture of the second display output area 41 when approaching the electronic apparatus, but they can only see a portion of the first display output area 42. In addition, in an actual implementation process, the predetermined distance may be set for each user individually, for instance, a user A will get a more comfortable viewing experience at 2 cm, then area of a cross-section of vision field of the user's eyes will be determined according to this predetermined distance, and further, size of the second display output area will be determined.

The functional main section further comprises a sensor and a control circuit; the sensor is configured to generate a detection signal of an interaction manner between the user wearing the electronic apparatus and the electronic apparatus; the sensor is connected with the control circuit, the control circuit is configured to enable the first display module and control the first display content to be displayed in the first display area of the first display module, when determining that the user wearing the electronic apparatus and the electronic apparatus are in the first interaction manner according to the detection signal; and/or the control circuit is configured to enable the second display module and control the second display content to be displayed in the second display area of the second display module, when determining that the user wearing the electronic apparatus and the electronic apparatus are in the second interaction manner according to the detection signal.

The sensor can detect a distance between the user's eyes and the electronic apparatus, regard this distance as a detection signal of the interaction manner, the sensor may be an infrared sensor, and detect a distance between the electronic apparatus and the user by infrared; accordingly, the control circuit determines whether the distance between the user's eyes and the electronic apparatus is greater than a predetermined distance, it is determined that the user wearing the electronic apparatus and the electronic apparatus are in the first interaction manner when the distance is greater than the predetermined distance, it is determined that the user wearing the electronic apparatus and the electronic apparatus are in the second interaction manner when the distance is not greater than the predetermined distance, for instance, as shown in FIG. 4, when the user is close enough to the electronic apparatus, the control circuit determines to switch to the second interaction manner.

Alternatively, the sensor provided by another embodiment of the present application is configured to sense a relative position between the electronic apparatus and the viewer wearing the electronic apparatus, and regard this relative position as a detection signal of the interaction manner, the sensor may be a gravity sensor. For instance, as shown in FIG. 8a, when the relative position between the electronic apparatus and the viewer wearing the electronic apparatus as sensed by the sensor satisfies a first relative area 81, it represents that the electronic apparatus is located in a side area of the viewer's body; as shown in FIG. 8b, when the relative position between the electronic apparatus and the viewer wearing the electronic apparatus as sensed by the sensor satisfies a second relative area 82, it represents that that the electronic apparatus is located in an area in front of chest of the viewer's body; as shown in FIG. 8c, when the relative position between the electronic apparatus and the viewer wearing the electronic apparatus as sensed by the sensor satisfies a third relative area 83, it represents that that the electronic apparatus is located in an area in front of head of the viewer's body. In a practical application process of the electronic apparatus provided by the embodiment of the present application, when the relative position between the electronic apparatus and an viewer wearing the electronic apparatus as sensed by the sensor satisfies the first relative area, the electronic apparatus controls the first display module and the second display module in a low power consumption state (an Off state or a Standby state); when the relative position between the electronic apparatus and the viewer wearing the electronic apparatus as sensed by the sensor satisfies the second relative area, the electronic apparatus determines it is in the first interaction manner, controls the first display module in an active state and controls the second display module to maintain in the low power consumption state; when the relative position between the electronic apparatus and the viewer wearing the electronic apparatus as sensed by the sensor satisfies the third relative area, the electronic apparatus determines to switch to the second interaction manner, and at least controls the second display module in the active state, however, in practice, it is possible to simultaneously control the first display module in the low power consumption state; when the relative position between the electronic apparatus and the viewer wearing the electronic apparatus as sensed by the sensor satisfies the third relative area, it is possible to simultaneously control the first display module in the low power consumption state; likewise, when the relative position between the electronic apparatus and the viewer wearing the electronic apparatus as sensed by the sensor satisfies the third relative area, the first display module is maintained in the active state (the active state in this case is controlling the first display module in the active state in the second relative area). When the relative position between the electronic apparatus and the viewer wearing the electronic apparatus as sensed by the sensor satisfies the first relative area again, the electronic apparatus controls the first display module and the second display module to switch to the low power consumption state (an Off state or a Standby state).

The two display modules in the electronic apparatus provided above may have various using states when being used. Now, description is provided with the electronic apparatus as a smart watch worn on the wrist as example, for instance, the user is walking, at this moment the user's arms are drooping naturally, in this case, the first display module and the second display module of the electronic apparatus may both in a low power consumption state like an Off state or a Standby state etc., the Off state or the Standby state can save power to extend using time of the electronic apparatus; when the user's arms are drooping naturally, it is considered that the electronic apparatus is in the first relative area, that is, the first relative area indicates a relative positional relationship between the user and the electronic apparatus, i.e., the side area of the user's body.

Next, the user wants to check time at a certain moment during walking, at this moment the user will raise an arm, it is assumed that the electronic apparatus is in the second relative area when the user is raising the arm (i.e., area in front of chest of the user's body); in this case, the electronic apparatus detects itself in the second relative area, enables the first display module (the first display module will be turned on or waken up), and then displays time to the user; or prompt information is displayed to the user by the first display module.

At this time, if the user wants to see data content more associated with the prompt information, then he/she will continue to approach the electronic apparatus to the eyes, it is assumed that in this case the electronic apparatus is in the third relative area (i.e., area in front of head of the user's body), that is, when the electronic apparatus is in the third relative area, the electronic apparatus will enable the second display module, when the user's eyes are close to a light spot 200 formed on a protective layer after enabling the second display module, the user can view the associated data content by the second display module, through the light spot 200.

As will be appreciated, the above scenario does not make definition to applying of the present application, using scenario of the present application may further include a user lying in bed, for instance, as shown in FIG. 9, when the user wants to view the information, he/she can raise the hand to the second relative area 92, then the sensor will obtain detection data of the interaction manner, and further the control circuit will determine to enter the first interaction manner based on the detection data, control the first display module to be turned on to display the first display content; and further, if the user wants to view detailed information related to the first display content, that is, he/she wants to view the second display content, he/she can raise the arm to the third relative area (not shown in the figure), the control circuit determines to enter the second interaction manner, controls the second display module to be turned on, and meanwhile the first display module may be turned off, or may not be turned off.

Alternatively, the sensor may also be a touch sensor, which obtains detection information the interaction manner by detecting a touch operation of the user on an outer surface of the frame body; for instance, when it is detected that the touch operation of the user is sliding from the first display area to the second display area, the control circuit determines to enable the second display module.

The above three types of implementations, that is, detecting by the sensor a distance between the user's eyes and the electronic apparatus as a detection signal of the interaction manner, detecting by the sensor a relative area of the electronic apparatus relative to the user as a detection signal of the interaction manner, detecting by the sensor the touch operation of the user as a detection signal of the interaction manner, is not alternative optionally, that is, the three types may be used in combination or alone, or in pairwise combination. In this way, it is possible to determine whether to trigger the first interaction manner or the second interaction manner by detecting the position of the electronic apparatus, which enhances user experience with regard to the electronic apparatus.

In this embodiment, the first display content and the second display content may be associated with each other or not associated with each other.

Specifically, when the first display content and the second display content are associated with each other, the second display content may be an identification image that can be used to obtain the first display content, for instance, a two-dimensional code that can make the user obtain the first display content; the second display content may also be a data item by which the first display content can be operated, for instance, sharing and downloading and other virtual operation keys; alternatively, the second display content may also be a part of the first display content. For instance, as shown in FIG. 5, the second display content 52 may be map route information; accordingly, the first display content 51 may be a direction indicator to which the second display data 52 corresponds, i.e., arrow pointing, so that the user can move according to the direction indicator.

Alternatively, the first display content may be a prompt of text information received by the electronic apparatus (e.g. SMS), and may also be a picture containing text (such as MMS); the second display content is the specific information to which the first display content corresponds, as shown in FIG. 6, the first display content 61 comprises "a new piece of information", then the second display content 62 is the displayed specific information.

Alternatively, the first display content may be information prompting a way to share the second display content, the second display content may be any information like text, image, or video; the text, image, or video may be resources stored in the electronic apparatus itself, and may also be network resources obtained online by the electronic apparatus after accessing a network. As shown in FIG. 7, the first display content 71 has four operable sharing ways "E-mail", "Bluetooth", "Sharing", "Microblog", for instance, the second display content 72 may be sent to a certain contact by email; or the second display 72 may be propagated to a corresponding electronic apparatus via Bluetooth; or the second display content 72 may be shared with friends in Wechat; or the second display content 72 may be sent to Microblog; wherein operable data items in the second display content are not limited to the aforesaid operable data items.

Alternatively, the electronic apparatus is set as a Wi-Fi hotspot by itself, then the electronic apparatus obtains a storage location (storage address) of the second display content in its own storage area, generates a two-dimensional code image based on the storage location, and regards the two-dimensional code image as the first display content. In this way, the other electronic apparatus can identify the two-dimensional code image in the first display content through a scan function (two-dimensional code scan), thereby the other electronic apparatus can obtain the second display content based on the two-dimensional code image.

Alternatively, since the first display content can be observed only when the user's eyes approach the second display output area, or after being authorized by the user, the other user's eyes approach the second display output area, while the first display content can be observed when the user's eyes are away from the first display area, i.e., all users are able to observe the first display content; a privacy level of the second display content is higher than that of the first display content, thus partial display content in the second display content can be extracted, in short, when the second display content is private content, the whole second display content can be observed only in the second interaction manner, while the first display content is displayed as a piece of prompt information. As such, it is possible to improve the privacy when using the electronic apparatus.

Power consumption of the first display module is smaller than that of the second display module.

The first display module may be a regular module commonly used currently, like an LED display module or an LCD display module; the second display module is an optical projection system, a first portion of the second display module is an light guide optical component, a second portion of the second display module is a display component and a collimating component; the light guide optical component is made from transparent material; the display component is configured to display and output the second display content, and project a first beam in a mode of light beam to be output; the collimating component is configured to process and transform the first beam projected and output in the mode of light beam into a second light beam to be output; the light guide optical component is configured to propagate the second beam in the transparent material from which the light guide optical component is made, the light guide optical component comprises a reflection unit provided in a specific area of an overstep portion and configured to change a propagation direction of the second beam in the transparent material, so as to project in the second direction; the second direction is consistent with an output direction of the first display content in the first display area of the first display module; the specific area in which the reflection unit is provided of the light guide optical component is the second display area of the second display module.

The second display module 32 in FIG. 3 will be described in detail below. FIG. 10 is a first structural schematic diagram of the second display module according to an embodiment of the present application, FIG. 11 is a second structural schematic diagram of the second display module according to an embodiment of the present application, as shown in FIGS. 10 and 11, the display component 321 comprises a beam splitting unit 3211 and a display unit 3212, the collimating component 322 comprises a second collimating unit 3221 and a first collimating unit 3222, and a polarization beam splitting unit 3223, the light guide optical component 323 comprises a wave guide unit 3231 and a reflection unit 3232. The display component 321 in FIG. 5-2 further comprises a light emitting unit 3210. The collimating component 322 processes and transforms the first beam projected and output in the mode of light beam into a second light beam to be output to the second light guide optical component 323.

In particular, the collimating component 322 comprises a second collimating unit 3221 and a first collimating unit 3222, and a polarization beam splitting unit 3223 provided between the second collimating unit 3221 and the first collimating unit 3222, the first beam output from the display component is initially reflected by the polarization beam splitting unit 3223 to the first collimating unit 3222, and thereafter collimated by the first collimating unit 3222 and the second collimating unit 3221, and then passes through the polarization beam splitting unit 3223 to be exited as the second beam.

Here, the first collimating unit 3222 and the second collimating unit 3221 may be a single lens or a lens group as needed by design.

The light guide optical component 323 is configured to propagate the second beam in the material from which the light guide optical component is made, and finally propagate the same to the viewer; the light guide optical component 323 comprises a waveguide unit 3231 and a reflection unit 3232, the coming second beam can be controlled by setting the position and angle of the reflection unit 3232 and guided to the specific position to be exited. In a first case, the collimating component 322 and the display component 321 are at a first side relative to a plane on which the wave guide unit 3231 is located, when the reflection unit 3132 is set, the second beam may be exited towards a second side relative to the plane on which the wave guide unit 3231 is located, the first side and the second side are opposite sides relative to the plane on which the wave guide unit 3231 is located.

Specifically, when the second display module is for example applied to a smart watch, the configuration example as described above may be adopted, so that the second beam is exited towards the second side, that is, the second beam is exited towards the eyes of the user wearing and viewing the strap-type electronic apparatus. In further detail, it is possible to configure the exiting direction of the second display module according to viewing requirement, for instance, the reflection unit 3232 may be controlled to rotate, so as to control the exiting direction of the reflection unit 3232, thus achieving switch of bidirectional display of the second display module. In the embodiment of the present application, the reflection unit 3232 may be a single prism or a prism group as needed by design.

In the embodiment of the present application, the first display module has a first display output area, as described above, the first display module is a first display screen, thus physical size of the first display screen is consistent with size of the first display output area.

The second display module has a second display output area, the second display output area is a specific area of an overstep portion in which the reflection unit is provided. In general, physical size of the reflection unit seen by the viewer (user) is not less than size of the second display output area, and size of the display unit in the second display module is smaller than that of the second display output area. It should be noted that, FIG. 10 or 11 is only to help those skilled in the art to understand the technical solution of the present application, rather than the state when the electronic apparatus provided by the embodiment of the present application is being used; for instance, when the electronic apparatus is being used, it is fixed to the support body, when the support body is the wrist, the user raises the arm will place the electronic apparatus in front of the eyes, thus it can be seen that the user can view the information provided by the electronic apparatus at a front angle during the time of using.

In the embodiment of the present application, the fixing device is a connecting strip made from flexible material, the connecting strip is movably connected with the frame body, for instance, it may be an elastic strip by stretching which the electronic apparatus is worn to the wrist; or the fixing device is a connecting strip made from flexible material and a locking structure, the connecting strip is movably connected with the frame body, and is immovably connected with the locking structure, for instance, the locking structure is a buckle by which the connecting strip that is divided into two portions are fastened.

The connecting strip has a receiving space within which the control circuit is provided based on a shape of the receiving space; the control circuit is conducted out of the receiving space of the connecting strip via a flexible connecting line and conducted into the frame body to be electrically connected with the first display module and the second display module, respectively. For instance, the control circuit may be provided at a lower right side of the second display module 32 in the structure diagram shown in FIG. 3, signals of the first display module and the second display module are propagated to the control circuit by connecting the propagation line.

Accordingly, by means of adopting the above solution, the first display output area and the second display output area can be obtained on the outer surface of the frame body, the first display area is larger than the second display area, and size of the first perceived image is smaller than that of the second perceived image. Thereby, multiple areas are physically divided on the electronic apparatus, and more information can be shown on the outer surface of the frame body.

As will be appreciated by those skilled in the art, functions of respective processing units in the electronic apparatus in the embodiments of the present application can be understood with reference to the related descriptions provided for the preceding information processing method, the respective units in the electronic apparatus in the embodiments of the present application may be implemented by the functional analog circuits described in the embodiments of the present application, and may also be implemented by running of the software that executes the functions described in the embodiments of the present application on a smart terminal.

Those skilled in the art should understand that, the embodiments of the present disclosure can be provided as a method, a system or a computer program product. Therefore, the present disclosure can adopt forms of a full hardware embodiment, a full software embodiment, or an embodiment combining software and hardware aspects. And, the present disclosure can adopt forms of a computer program product implemented on one or more computer usable storage mediums (including, but not limited to, magnetic disk storage, CD-ROM, optical memory, or the like) including computer usable program codes.

The present disclosure is described by referring to flow charts and/or block diagrams of method, apparatus and computer program product according to the embodiments of the present disclosure. It should be understood that each flow and/or block in the flow charts and/or block diagrams and the combination of the flow and/or block in the flow charts and/or block diagrams can be implemented by computer program instructions. These computer program instructions can be provided to processors of a general purpose computer, a dedicated computer, an embedded processor or other programmable data processing apparatus to generate a machine, so that a device for implementing functions specified in one or more flows of the flow charts and/or one or more blocks of the block diagrams is generated by the instructions executed by the processors of the computer or other programmable data processing apparatus.

These computer program instructions can also be stored in computer readable storage which is able to direct the computer or other programmable data processing apparatus to operate in specific manners, so that the instructions stored in the computer readable storage generate manufactured articles including commander equipment, which implements functions specified by one or more flows in the flow charts and/or one or more blocks in the block diagrams.

These computer program instructions can be loaded to computer or other programmable data processing apparatus, so that a series of operation steps are executed on the computer or other programmable apparatus to generate computer implemented process, so that the instructions executed on the computer or other programmable apparatus provide steps for implementing functions specified in one or more flows of the flow charts and/or one or more blocks of the block diagrams.

The above described are only preferable embodiments of the present application, they are not intended to limit the protection scope of the present application.

The invention claimed is:

1. An electronic apparatus comprising:
   a frame body;
   a fixing device connected with the frame body and configured to fix the electronic apparatus to a support body, wherein the frame body and the fixing device form an annular space when the electronic apparatus is fixed to the support body by the fixing device;
   a functional main section comprising a display device provided within the frame body and having a first display area and a second display area, the first display area being larger than the second display area;
   wherein when a first display content is displayed in the first display area via the display device, a first display output area corresponding to the first display area is formed on an outer surface of the frame body and when a second display content is displayed in the second display area via the display device, a second display output area corresponding to the second display area is formed on an outer surface of the frame body, with content of the second perceived image is the second display content; size of the first perceived image is smaller than that of the second perceived image, the first display output area is larger than the second display output area; the first interaction manner is different from the second interaction manner,
   wherein the display device comprises a first display module and a second display module, the first display module and the second display module have different display principles, the first display module has the first display area; the second display module has the second display area; due to the different display principles of the first display module and the second module, the first interaction manner that the user uses the first display module of the electronic apparatus and the second interaction manner that the user uses the second display module of the electronic apparatus are different;

the first interaction manner is a viewing manner that the user's eyes are away from the first display output area on the electronic apparatus; the second interaction manner is a viewing manner that the user's eyes approaches the second display output area on the electronic apparatus;

when the user is away from the first display output area on the electronic apparatus in the first interaction manner, the user's eyes causes the user to perceive the first perceived image; size of the first perceived image is equal to that of the first display output area; when the user approaches the second display output area on the electronic apparatus in the second interaction manner, a light beam emitted by the second display module is incident to the user's eyes, so the user perceives the second perceived image; size of the second perceived image is larger than that of the second display output area.

2. The electronic apparatus according to claim 1, wherein the second display area is smaller than or equal to a predetermined area; the first display area is larger than the predetermined area.

3. The electronic apparatus according to claim 2, wherein the predetermined area is an area of a cross-section of vision field of the user's eyes when the user's eyes and the electronic apparatus satisfy a predetermined distance.

4. The electronic apparatus according to claim 3, wherein the first display content and the second display content are associated with each other; or the first display content and the second display content are not associated with each other.

5. The electronic apparatus according to claim 1, wherein the functional main section further comprises a sensor and a control circuit; the sensor is configured to generate a detection signal of an interaction manner between the user wearing the electronic apparatus and the electronic apparatus;

the sensor is connected with the control circuit, the control circuit is configured to enable the first display module and control the first display content to be displayed in the first display area of the first display module, when determining that the user wearing the electronic apparatus and the electronic apparatus are in the first interaction manner according to the detection signal;

and/or the control circuit is configured to enable the second display module and control the second display content to be displayed in the second display area of the second display module, when determining that the user wearing the electronic apparatus and the electronic apparatus are in the second interaction manner according to the detection signal.

6. The electronic apparatus according to claim 1, wherein power consumption of the first display module is smaller than that of the second display module.

7. The electronic apparatus according to claim 6, wherein the second display module is an optical projection system, a first portion of the second display module is an light guide optical component, a second portion of the second display module is a display component and a collimating component;

the light guide optical component is made from transparent material;

the display component is configured to display and output the second display content, and project a first beam in a mode of light beam to be output;

the collimating component is configured to process and transform the first beam projected and output in the mode of light beam into a second beam to be output;

the light guide optical component is configured to propagate the second beam in the transparent material from which the light guide optical component is made, the light guide optical component comprises a reflection unit provided in a specific area of an overstep portion and configured to change a propagation direction of the second beam in the transparent material, to project in the second direction; the second direction is consistent with an output direction of the first display content in the first display area of the first display module; the specific area in which the reflection unit is provided of the light guide optical component is the second display area of the second display module.

8. The electronic apparatus according to claim 1, wherein the fixing device is a connecting strip made from flexible material, the connecting strip is movably connected with the frame body; or the fixing device is a locking structure and a connecting strip made from flexible material, the connecting strip is movably connected with the frame body, and is immovably connected with the locking structure.

9. The electronic apparatus according to claim 8, wherein the connecting strip has a receiving space within which the control circuit is provided based on a shape of the receiving space; the control circuit is conducted out of the receiving space of the connecting strip via a flexible connecting line and conducted into the frame body to be electrically connected with the first display module and the second display module, respectively.

* * * * *